United States Patent
Friedman et al.

(10) Patent No.: US 9,715,370 B2
(45) Date of Patent: *Jul. 25, 2017

(54) METHOD AND SYSTEM FOR PROVIDING CONTENT

(71) Applicant: Amplifier Marketing Pty Limited, Melbourne (AU)

(72) Inventors: Adam Friedman, Melbourne (AU); Ivo Ruben Willem Jager, Melbourne (AU); Roberto Parlavecchio, Melbourne (AU); Marc Teichtahl, Melbourne (AU)

(73) Assignee: Amplifier Marketing Pty Limited, Melbourne (AU)

(*) Notice: Subject to any disclaimer, the term of this patent is extended or adjusted under 35 U.S.C. 154(b) by 0 days.

This patent is subject to a terminal disclaimer.

(21) Appl. No.: 14/948,115

(22) Filed: Nov. 20, 2015

(65) Prior Publication Data

US 2016/0077808 A1    Mar. 17, 2016

Related U.S. Application Data

(63) Continuation of application No. 13/982,205, filed as application No. PCT/AU2012/000070 on Jan. 27, 2012, now Pat. No. 9,201,631.

(30) Foreign Application Priority Data

Jan. 27, 2011  (AU) ................. 2011900257

(51) Int. Cl.
*G06F 9/44*  (2006.01)
*G06F 17/22*  (2006.01)
(Continued)

(52) U.S. Cl.
CPC ............ *G06F 8/20* (2013.01); *G06F 8/30* (2013.01); *G06F 8/35* (2013.01); *G06F 17/2264* (2013.01);
(Continued)

(58) Field of Classification Search
CPC ..... G06F 8/20; G06F 8/30; G06F 8/35; G06F 17/30011
See application file for complete search history.

(56) References Cited

U.S. PATENT DOCUMENTS 6,623,529 B1 * 9/2003 Lakritz ............... G06F 17/2288
                                                        707/E17.109
6,742,015 B1    5/2004 Bowman-Amuah
(Continued)

FOREIGN PATENT DOCUMENTS

EP    1069501 A2    1/2001

OTHER PUBLICATIONS

Search Report for EP Patent Application No. 12739276.9 mailed on Jul. 23, 2014 (7 pages).
(Continued)

*Primary Examiner* — Chameli Das
(74) *Attorney, Agent, or Firm* — John W. Branch; Lowe Graham Jones PLLC

(57) ABSTRACT

A computer-implemented method for generating one or more applications, the method including the steps of: accessing a template for holding content; populating the template with the content; generating the one or more applications, configured for a plurality of computing platforms, based on the populated template; and making the applications available for distribution by a server.

18 Claims, 16 Drawing Sheets

(51) Int. Cl.
  *G06F 17/30* (2006.01)
  *G06F 17/24* (2006.01)
(52) U.S. Cl.
  CPC ...... *G06F 17/248* (2013.01); *G06F 17/30896* (2013.01)

(56) References Cited

U.S. PATENT DOCUMENTS

| | | | |
|---|---|---|---|
| 6,886,046 B2 | 4/2005 | Stutz et al. | |
| 8,176,466 B2 | 5/2012 | Tristram | |
| 8,261,235 B2 | 9/2012 | Chapman | |
| 8,438,304 B2 | 5/2013 | Stelting | |
| 2003/0037328 A1* | 2/2003 | Cicciarelli | G06F 8/60 717/178 |
| 2003/0041110 A1* | 2/2003 | Wenocur | G06Q 10/107 709/206 |
| 2003/0233631 A1 | 12/2003 | Curry et al. | |
| 2004/0064351 A1 | 4/2004 | Mikurak | |
| 2005/0177784 A1 | 8/2005 | Andrews et al. | |
| 2005/0198618 A1* | 9/2005 | Lalonde | G06F 8/34 717/110 |
| 2005/0268279 A1 | 12/2005 | Paulsen et al. | |
| 2007/0089053 A1* | 4/2007 | Uhlig | G06F 17/212 715/255 |
| 2007/0124661 A1 | 5/2007 | Hackworth et al. | |
| 2007/0288890 A1* | 12/2007 | Wells | G06F 8/38 717/113 |
| 2008/0120129 A1* | 5/2008 | Seubert | G06Q 10/06 705/35 |
| 2008/0229217 A1* | 9/2008 | Kembel | G06F 17/30899 715/760 |
| 2008/0306883 A1* | 12/2008 | Baffier | G06F 8/61 705/400 |
| 2010/0077386 A1 | 3/2010 | Akkiraju et al. | |
| 2010/0131922 A1* | 5/2010 | Shenfield | G06F 8/20 717/107 |
| 2011/0296391 A1* | 12/2011 | Gass | G06F 8/72 717/168 |
| 2011/0321003 A1* | 12/2011 | Doig | G06F 8/34 717/107 |
| 2012/0259722 A1 | 10/2012 | Mikurak | |
| 2013/0283262 A1* | 10/2013 | Rehtijarvi | G06F 8/60 717/178 |
| 2013/0339922 A1* | 12/2013 | Sproule | G06Q 10/063 717/103 |
| 2013/0346485 A1* | 12/2013 | Kembel | G06F 17/30899 709/203 |
| 2014/0047413 A1 | 2/2014 | Sheive et al. | |
| 2016/0048481 A1* | 2/2016 | Calvin | G06F 8/24 715/234 |

OTHER PUBLICATIONS

Allen, S. et al. "Pro Smartphone Cross-platform Development: IPhone, Blackberry, Windows Mobile, and Android Development and Distribution." New York, NY, Apress, Sep. 28, 2010 (20 pages).
Angela Mitchell, "Create Your Own App with Conduit Mobile", Dec. 28, 2011, About.com, http://performingarts.about.com/od/Administration/a/Create-Your-Own-App-With-Conduit-Mobile.htm. 5 pages.
Martin Bryant, "Conduit's easy app-building platform gets a social refresh and Windows Phone support", Dec. 6, 2011, The Next Web, http://thenextweb.com/apps/2011/12/06/conduits-easy-app-building-platform-gets-a-social-refresh-and-windows-phone-support/. 4 pages.
Anonymous II, "Anyone Can Create Apps with New Online Program", Mar. 22, 2011, TechNewsDaily, http://www.conduit.com/mediacoverage/item/anyone-can-create-apps-with-new-online-program. 1 page.
J. Angelo Racoma, "Conduit Mobile Platform Now Supports iPad App Creation, Social Features", Jun. 3, 2011, CMSWire.com, http://www.cmswire.com/cms/mobile/conduit-mobile-platform-now-supports-ipad-app-creation-social-features-011485.php/. 4 pages.
Archived Copy of the AppMakr website www.appmakr.com, 1 page, Jan. 23, 2011, retrieved from Internet Archive Wayback Machine, https://web.archive.org/web/20110123051230/http://www.appmakr.com/ on Jan. 4, 2015. 2 pages.
Anonymous, "The 1M/1MDeal Radar 2010: AppMakr.com and PointAbout, Washington, DC", Dec. 23, 2010, One Million by One Million Blog, http://www.sramanamitra.com/2010/12/23/deal-radar-2010-appmakr-com-and-pointabout/. 5 pages.
Adam Dachis, "AppMakr Helps You Create Your Own iPhone App for Free, No Coding Necessary", Oct. 26, 2010, LifeHacker.com, http://lifehacker.com/5673309/appmakr-helps-you-create-your-own-iphone-app-for-free-no-coding-necessary. 7 pages.
John Biggs, "AppMakr: Make your own iPhone apps for just two bills", Jan. 6, 2010, TechCrunch.com, http://techcrunch.com/2010/01/06/appmakr-make-your-own-iphone-apps-for-just-two-bills/. 6 pages.
Matt Hickey, "AppMakr Transforms App Store Landscape, Enables Anyone to Make Their Own iPhone App", Jan. 3, 2010, TechCrunch.com, http://techcrunch.com/2010/01/03/appmakr-transforms-app-store-landscape-enables-anyone-to-make-their-own-iphone-app/. 9 pages.
Office Communication for U.S. Appl. No. 13/982,205 mailed on Jan. 27, 2015 (14 pages).
Office Communication for U.S. Appl. No. 13/982,205 mailed on Aug. 6, 2015 (14 pages).

* cited by examiner

METHOD AND SYSTEM FOR PROVIDING CONTENT

CROSS-REFERENCE TO RELATED APPLICATIONS

This patent application is a Continuation of U.S. patent application Ser. No. 13/982,205 filed on Jul. 26, 2013, and completed on Nov. 15, 2013, now U.S. Pat. No. 9,201,631 issued on Dec. 1, 2015, which is a U.S. National Stage application of International Patent Application No. PCT/AU2012/000070 filed on Jan. 27, 2012, which claims priority to Australian Patent Application No. 2011900257 filed on Jan. 27, 2011, the benefit of the earlier filing date of which is hereby claimed, and which are each further incorporated herein by reference in their entireties.

FIELD

The present invention generally relates to methods, systems, computer readable storage with instructions, and/or computer program products for providing content, e.g., content for computing platforms in the form of a computer-executable application, a web application, or a smart phone application, including at least portions of the application being accessible over a communication network.

BACKGROUND

Recently, there has been a proliferation of different computing platforms used by general consumers, which has increased the difficulty of providing content, and in particular applications and programs, that run on these different platforms. For example, the different platforms can include Apple's iOS for mobile devices, the Android operating system, and on-line platforms such as Facebook. The platforms are based on many different user devices, including smart phones, tablet computers, netbook computers, laptop/notebook computers, and desktop computers. Each platform can have different native capabilities or functionalities.

The following problem arises in providing new applications (or apps) to consumers (or users) of the platforms: the creation of apps for all these different platforms can be a technically challenging and costly exercise, as each platform requires different development tools, different types of expertise, different vetting and submission procedures, and supports different feature sets and platform-specific capabilities. In addition, not all platforms support the same types and levels of functionality. These issues need to be addressed for each platform individually.

Another problem is access to application may be limited to downloading applications through application stores associated with each operating system, e.g., the Apple Store, iTunes or the Windows Marketplace. Thus provision of new applications (and updates to applications) can be delayed undesirably due to the approval processes, including technical requirements of the different platforms (the approval process may take weeks or even months), and the time between completion of an application and actual distribution to the users can be significant.

It is desired to address or ameliorate one or more disadvantages or limitations associated with the prior art, or to at least provide a useful alternative.

SUMMARY

In accordance with the present invention there is provided a computer-implemented method for generating one or more applications, the method including the steps of:

accessing a template for holding content;
populating the template with the content;
generating the one or more applications, configured for a plurality of computing platforms, based on the populated template; and
making the applications available for distribution by a server.

The present invention also provides a computer-implemented method for distributing one or more applications to at least one computing device over a communications network, the method including the steps of:

sending the one or more applications to the computing device using the network;
monitoring one or more parameters associated with the one or more applications on the computing device; and
reporting the parameters to a remote database.

The present invention also provides a system including one or more modules configured to perform the above methods.

The present invention also provides an application for use on a computing device, the application including:

content for displaying to a user of the computing device during usage of the application by the user;
a sharing module for sharing the application with a different computing device;
an analytics module for monitoring: usage parameters representing the usage, and sharing parameters representing the sharing; and
a communications module for transmitting values associated with the usage parameters and the sharing parameters to a remote server.

BRIEF DESCRIPTION OF THE DRAWINGS

Preferred embodiments of the present invention are hereinafter described, by way of non-limiting example only, with reference to the accompanying drawings, in which.

DETAILED DESCRIPTION

Overview

Figure 1:
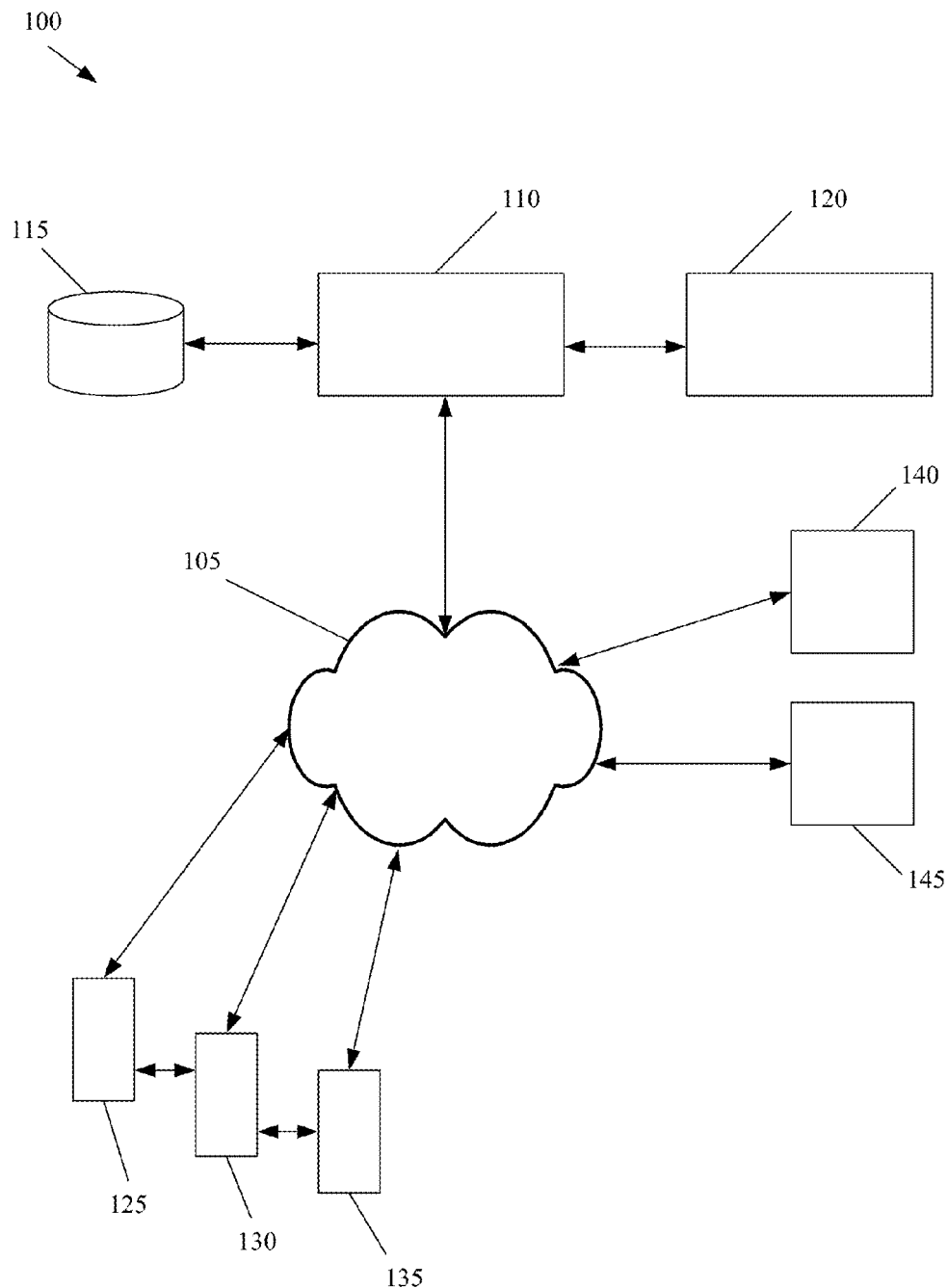
FIG. 1 is a schematic diagram of a system for providing content.
Figure 1A:
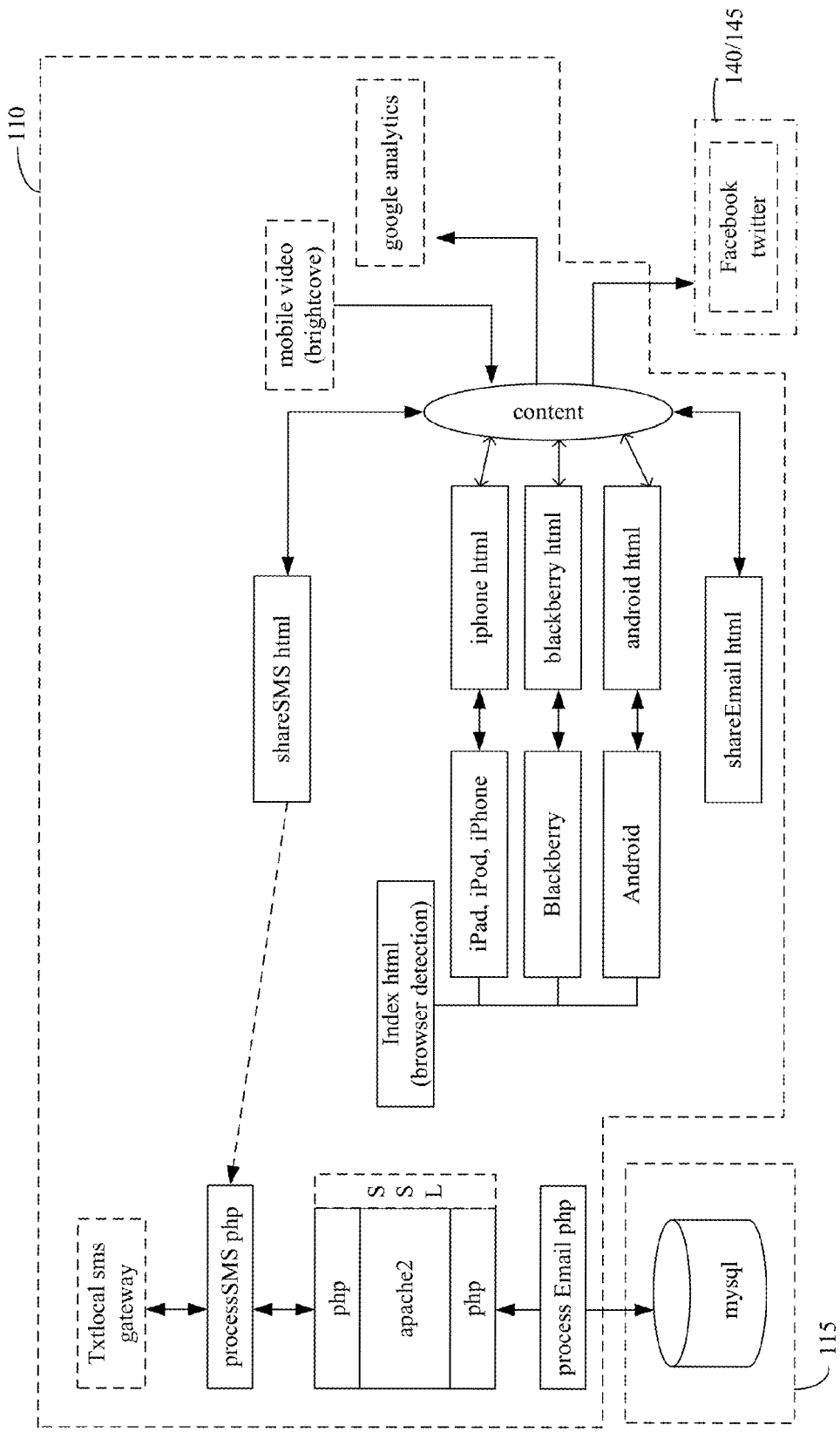
FIG. 1A is a schematic diagram of an example implementation of a portion of the system.

Described herein is an integrated system for rapidly generating and providing interactive content. The interactive content is usable and displayable on multiple different platforms and environments, as well as shareable across different platforms.

The interactive content can include an application (which can also be referred to as an "app") that runs natively (as a native application) and in a web browser (as a web app) on a plurality of different computer platforms, e.g., mobile devices, tablets computers, desktop computers, and within a plurality of different device-agnostic web environments, e.g., Flash, Java and JavaScript Software Development Kit (SDK)-enhanced services (such as Facebook).

The app can use platform-specific functionality in some devices, and gracefully degrade content when the expected platform-specific functionality is not available. The system can solve problems of efficiency, future proofing and bandwidth optimisation. The system can offer cross-platform shareability, and usage tracking of the generated applications.

The system provides a plurality of build steps for generation of the app. Through tight integration of the build steps, and context awareness of an app generation engine (referred to as a templating engine), the system can be efficient and flexible.

The system performs a computer-implemented method for producing one or more platform agnostic applications for use on a web-enabled computing platform, the method including the steps of: providing one or more templates for holding content; populating the one or more templates with content; generating one or more versions of the application suitable for running on a number of predetermined computing platforms; and making the application and its contents available for distribution via an agent server.

The template arrangement allows for rapid and timely production of apps. Users can download apps via an agent server, or in some embodiments through platform-specific application stores, such as iTunes and Android Market. Further, providing the apps from an agent server means that apps and updates need not be submitted for approval before they can be downloaded by the user.

The platform-agnostic apps can make it easy to deploy special offers directly to a user's platform.

The system provides a computer-implemented method for distributing one or more platform-agnostic (or -independent) applications to a user for use on a communication device over a mobile communications network, the method including the steps of: receiving a user ID of a user; allocating a unique ID to the one or more applications, the one or more parameters including a plurality of parameters; checking credentials of the user ID and sending the one or more applications to the user; monitoring and reporting changes in the one or more parameters of the one or more applications via the mobile communication device on the mobile communication device to a remote database.

The parameters can include one or more of: whether the application was forwarded to another mobile communication device; whether the application was deleted from the mobile communication device; which features of the application were used; and whether a hyperlink to the location of the application was shared.

Due to the platform agnostic nature of the apps, they can be shared between users, regardless of platform, which can make the application go viral (e.g., due to rapid and wide sharing among users). The great ease with which users can share the application, means it is possible to put an offer in the application which incentivises users to share the application.

The application usage data can be used in combination with tracking how users share the applications amongst each other to provide population-wide data that tracks usage and spread over time for an improved understanding of application use and propagation.

The sharing of the application includes, forwarding via a telecommunications-based short message service (SMS), email, platform dependent messaging services or via a social media platform. (e.g., Twitter).

The application can deliver content in different ways. The content can be included with a wrapper application, hosted from a web server, or a combination of the two.

The application can be instantly updated on the user's platform and users don't have to download or install updates, thus the version they have of the application can be always current.

Example System 100

The following description describes the system in the context of a 3G or more advanced mobile telephone network or the like. Alternatively, the invention could be carried out a number of terminals connected to the Internet and operating via website and server, and the user downloads the application from their computer to their mobile communication device.

Referring to FIG. 1 there is shown an example system 100 for producing one or more platform agnostic applications for use on a mobile communication device. The system 100 includes one or more mobile communication devices, 125, 130 and 135 connected to a network 105 which may be the Internet or it may be a mobile communication network, as appropriate. The mobile communication devices 125, 130 and 135 may each be associated with one or more social media applications 140 and 145 via the network 105. Also connected to the network 105 is an agent server 110 which includes a database 115. The agent server 110 is also connected to a client server 120 (also referred to as a client).

In operation, the one or more mobile communication devices 125, 130 and 135 are connected to the network 105 and logged in to the social media applications 140 and 145 together with the agent's server 110. The agent server 110 includes one or more applications or apps which have been made available for download. The agent's server 110 produces the applications automatically based on material provided from the client server 120. The client server 120 may belong to one or more organisations which are utilizing the service of the agent server 110. The first mobile communication device 125, for example, logs on via network 105 to the agent server 110 and downloads an application which is of interest to them. The application may be stored on a database 115. The user provides various credentials and other information in exchange for the application. The application is then downloaded onto the first mobile communication device 125. At this point, user data from the first mobile communication device may 125 be provided to the agent server 110 and stored on database 115. This application may then be forwarded to the client's server 120 for use as desired by the client associated with the client server 120. The user of the first mobile communication device 125 may then elect to forward the application to a second mobile communication device 130. Once this happens, the system 100 of the invention may advise via the network 105 to the agent server 110, that the application has been forwarded by that user associated with the first mobile communication 125 to a second user. This information is then stored on database 115 and may be relayed to the client server 120. Alternatively, this exchange of information may occur when the user of the first mobile communication device 125 subsequently logs onto agent sever 110. In addition, the first mobile communication device 125 may be associated with one or more social media applications 140, 145, such as Facebook or Twitter and when the first mobile communication device either downloads the application or the user forwards the application to another mobile communication device 130, this information may be updated on first social media application 140 or second social media 145 or both. This information may then be forwarded via network 105 to the agent's server 110 and stored on database 115 for forwarding to the client server 120 at a later time. In turn, the user of the second mobile communication device 130 may also forward the application (having received it from the first mobile communication device 125 or downloading it directly themselves) to a third mobile communication device 135. Again, the information regarding the forwarding of the application or the downloading of the application may be forwarded via network 105 to the agent server 110 or to the social media applications 140, 145 and then to the agent sever 110, where it is stored on database 115 for later referral to the client server 120.

As will further be described with referenced to FIGS. 2 to 6, the system and method of the present invention allows for creating of platform agnostic applications which may be downloaded and shared together with capturing information relating to the use of that application and forwarding that to the agent 110 and/or client 120. It would be appreciated that the first mobile communication device 125, second mobile communication device 130 and third mobile communication 135 may be mobile telephones or may be an iPad or hand held computer or laptop. Further, it will be appreciated that the communication or sharing of the application between the mobile communication devices, may be via email, SMS, social media application 140, 145, a web link or the like. Preferably, upon download the application at the agent server 110 determines or detects the device and optimises the application for use with that device. In particular this could include the type of device, the internet connection related to the device (i.e. scaling video up or down depending on dial up speeds, broadband speeds, mobile broadband and cost).

Figure 2:
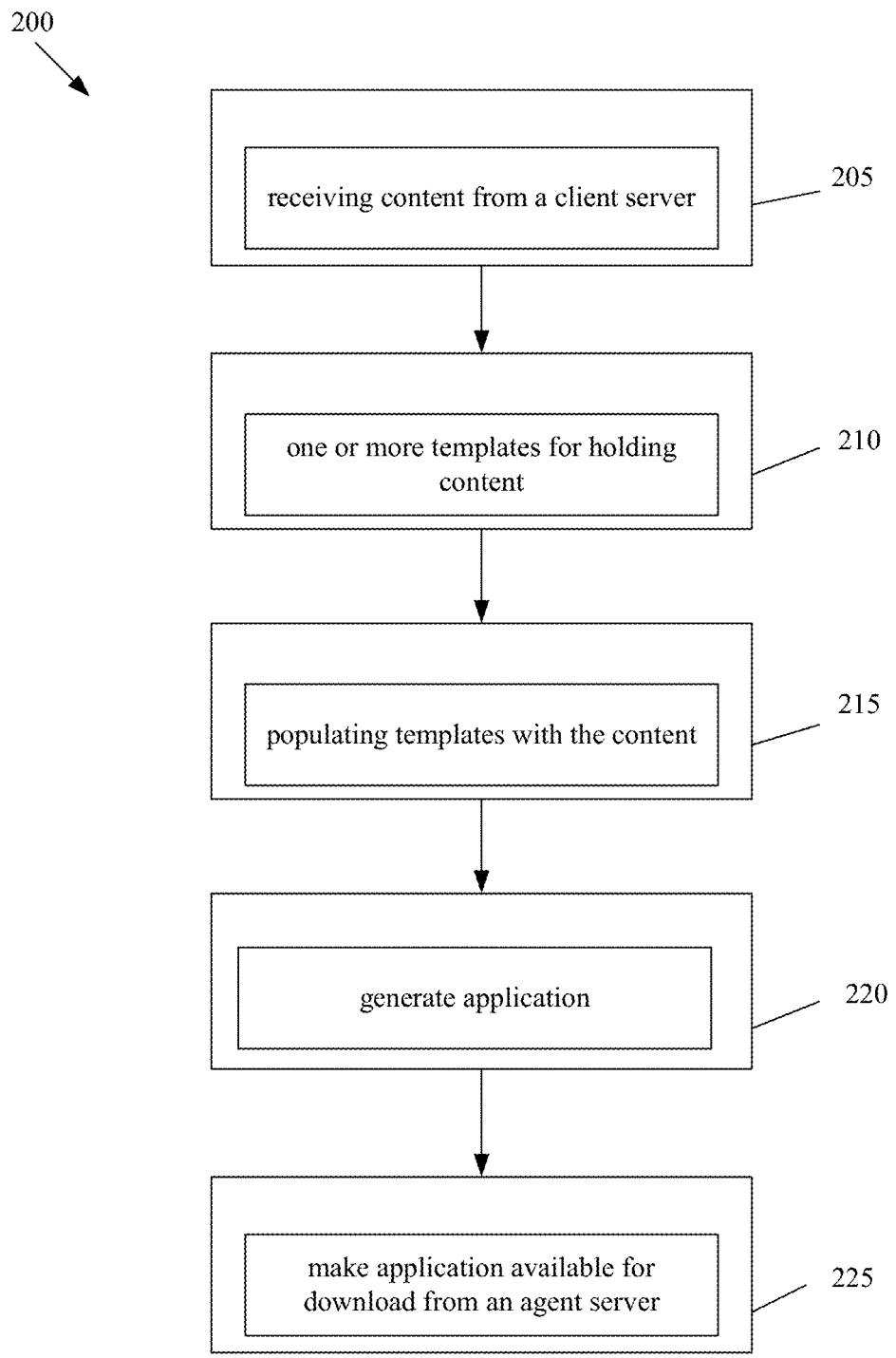
FIG. 2 is a flow chart of an example method provided by the system.

FIG. 2 is a flow diagram illustrating the method 200 for automatically producing a platform agnostic application from one or more parameters provided by a client via client server 120. At step 205, the agent server 110 receives content from the client server 120 which is to be used in the application to be generated. The content may include video, graphics, sound etc. At step 210, one or more templates are provided for holding the content. The template may be specified by the client via the client server or may be selected by a user associated with the agent server 110 having regard to the type of content provided at step 205. At step 215 the content is populated into the template and at step 220 the application is generated and a number of versions of the application (for different mobile devices or operating systems) are created. At step 225, the application is uploaded to the agent server 110 for download.

Figure 3:
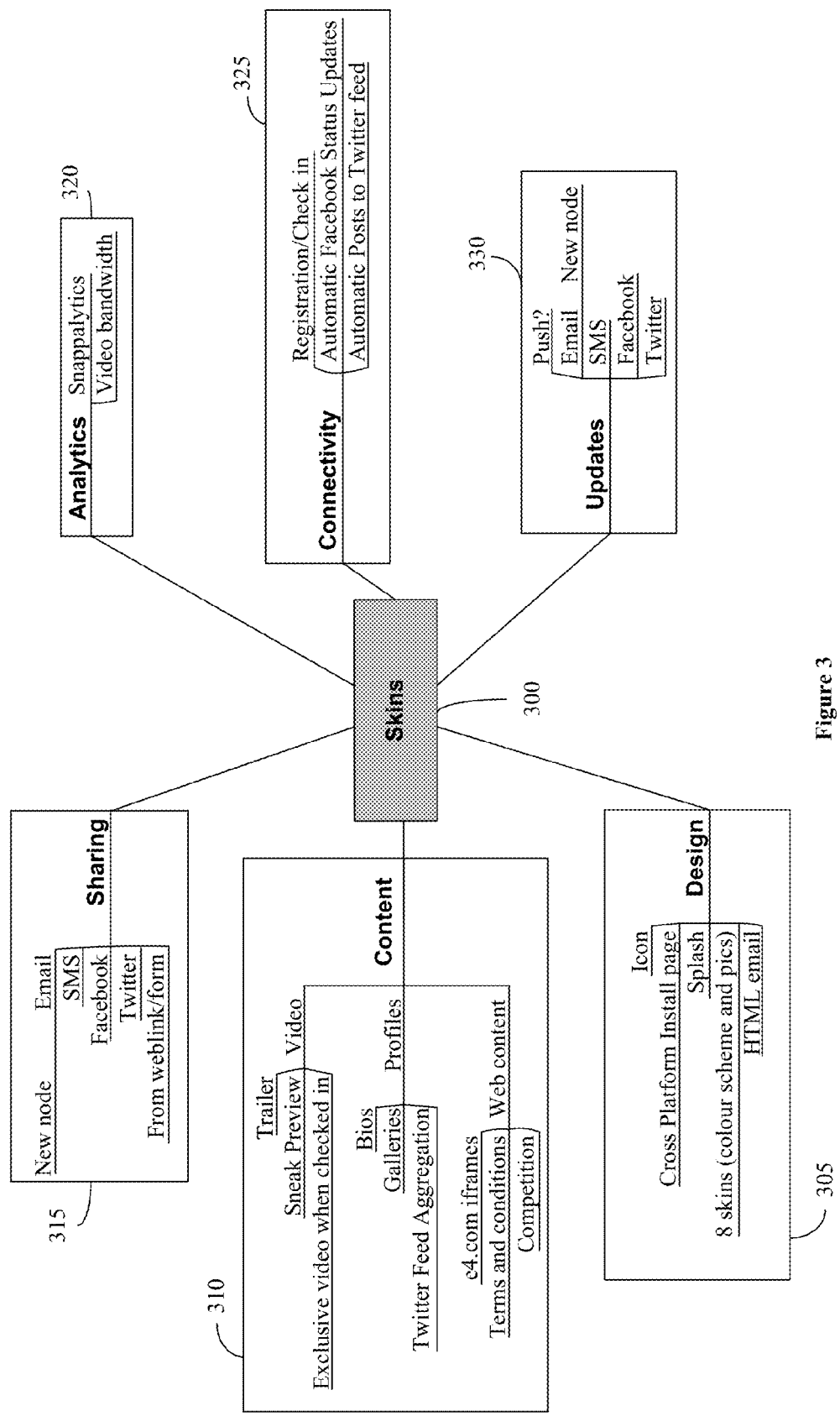
FIG. 3 is a schematic diagram of functions of an application provided by the system.

FIG. 3 is an overview of an application 300 showing the various components which are included in the application 300 which has been generated by the method and system of the present invention. The application 300 includes a number of components or modules, namely a design module 305 which includes the icon that the user of the mobile communication device will see when the application is downloaded (typically this is the icon that is visible on the desktop of the mobile communication device). A cross-platform install page is displayed such that when the user visits the install link, the browser detects the device they are on and deploys the correct download version for their device. A splash is also provided (i.e. an opening screen that appears while the app is loading), one or more skins (in this case 8-skins which corresponds to a colour scheme and pictures which may change over time and html email so that the user can email the app to a friend.

A content module 310 is also provided which is the main part art of the application in terms of its entertainment or interest value to the user. The content module 310 may include video in the form of a trailer if the application is directed to the promotion of a movie or television show, e.g., a sneak preview in the case of a movie or television show which is yet to be released or yet to have a trailer. Alternatively, or in addition to the above, exclusive video unavailable elsewhere may be provided, but only when the user checks-in, such as that described with reference to FIG. 4 below.

In addition, the content module 310 may include profile information, in the case of a television programme, for example, biographical information on characters and/or actors, galleries of characters and/or actors and/or a Twitter feed aggregation based on a hash tag, for example, or a twitter feed associated with the particular television programme or video or advertiser.

In addition, the content module 310 may include web content which includes a link to a website which may include a competition, terms and conditions and the like. Although not shown, content module 310 may also include audio, in the case of the promotion of an artist or album and may include, for example, biographies, galleries, a Twitter feed, sneak audio preview of a track from the forthcoming album etc.

The amount of content made available via the content module 310 may be dictated by how much information the user associated with a mobile communication device 125 provides in order to download the application 300 from the agent server 110. The application 300 also includes a sharing module 315 which determines whether or not the application which has been downloaded is shared or not and how often. The sharing may be via email, SMS, Facebook link, Twitter feed or via a web-link and/or form. Typically the data acquired by the sharing modules is updated via the network 105 to the agent's server 110 and stored on database 115 and then relayed to the client server 120 at appropriate times. Preferably, the information obtained via the sharing module 315 is only uploaded to the agent server 110 when the user of the mobile communication device 125 logs in to the agent server 110, such as to download applications. The analytics module 320 works in communication with the sharing module 315 and as discussed above, determines how often the application has been shared and to whom (where possible). The analytics module 320 may also obtain information with regard to the video bandwidth used on a particular device, for example whether it was a high resolution video, or low resolution video, statistics on Twitter feed aggregation, Google analytics etc.

Further there is included a connectivity module 325 which enables the user associated with the mobile communication device 125 to register and/or check-in with the agent server 110. The connectivity module also allows for automatic Facebook status updates and/or automatic posts to a Twitter feed which is associated with the user of the mobile communication device 125, provided that the user of the mobile communication device 125 has authorized the system 100 to do so. The connectivity module 325 typically provides an update to a Facebook status or Twitter feed when a certain action has been carried out, such as the download of an application or the forwarding of an application or if the user enters a competition, for example.

Finally, the application 300 includes an updates module which allows for additional apps to be generated, or existing apps to updated, for example, new information and content can be pulled down from the web (i.e. new videos, etc.).

Figure 4:
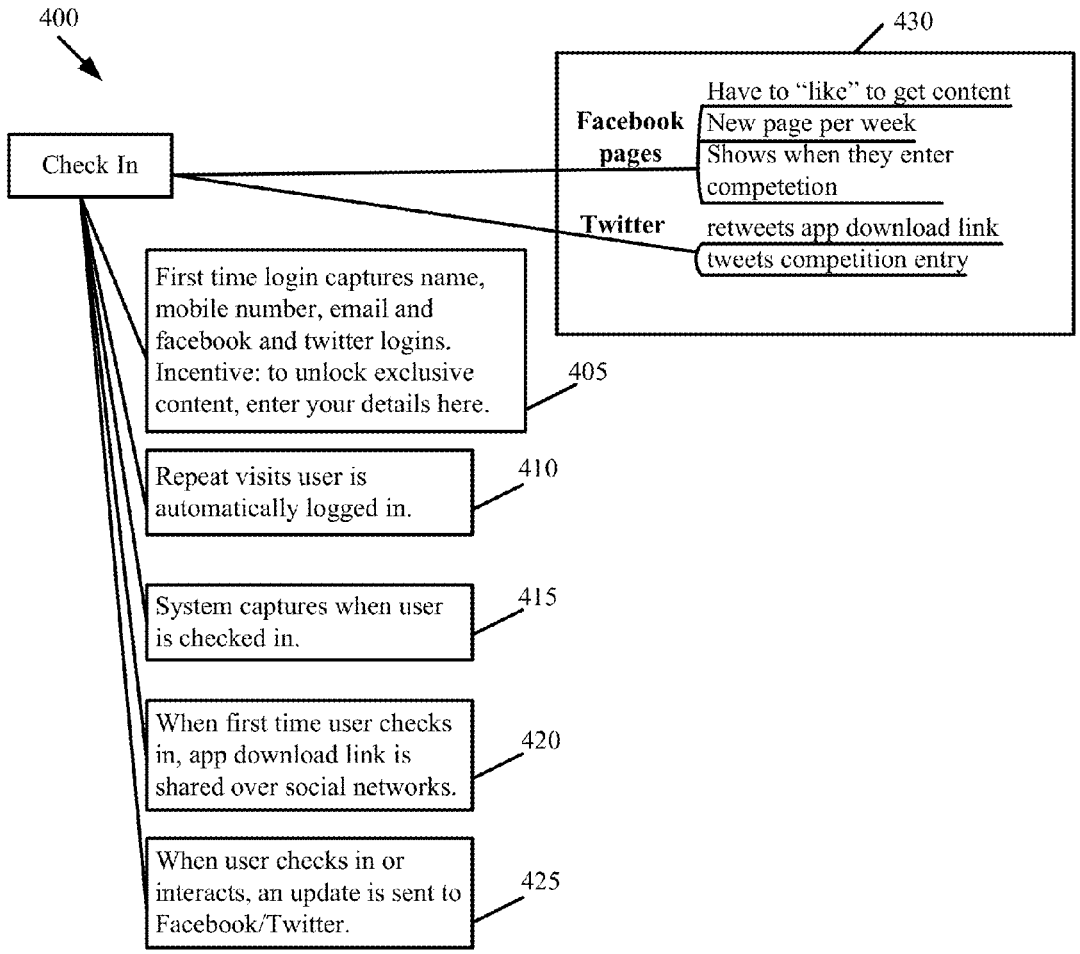
FIG. 4 is a flow chart of a user downloading the application.

FIG. 4 is a flow diagram showing the check-in process from a user point of view in accessing the agent server 110 over the network 105 as shown with reference to FIG. 1. At step 405, assuming this is the first time the user associated with the mobile communication device 125, 130 or 135 logs in, the system and method of the invention will capture the name, mobile number, email, Facebook details and Twitter log-ins for that particular user. It may be that the user at step 405 declines to provide their Facebook and Twitter login details. This will not prevent the application from being forwarded, however it is envisaged that there will be an incentive to provide more details to the system in order to unlock exclusive content contained within the application which is be downloaded. For example, if a user only elects to provide basic information such as a mobile number, they will receive a basic version of the application upon download, whereas if they provide all of their details they will receive an enhanced version of the application upon download.

Alternatively, at step 410, in the event the user has already registered, the user automatically is logged in. This may be arranged via cookies or the like at the initial log-in stage 405.

At step 415, the system and method of the present invention captures analytic data associated with that mobile communication device. In particular, whether or not the application that they have previously downloaded has been forwarded, commented on and the like. In practice the data will be stored locally on the mobile communication device 125 associated with the application and it is only when the user logs in to the system that this information is uploaded to the server 110. In an alternative, this could happen instantaneously, provided the user is not charged for uploading data.

At step 420, assuming the user is a first time user who has checked-in and they have downloaded the application they wish to download, a download link is shared over their social media networks which were entered at step 405. So in this case if the user had shared their Facebook and Twitter log-in for example their friends or followers would be updated with this information, together with a download link. It will be appreciated that other social media could be used, e.g., Tumblr, blogs, Digg, etc—(i.e. anything that can be linked to on the web can be linked to in the app environment). An update status may be provided to their account which indicates that they have just downloaded an application from the agent server 110 and provide a link to the agent server 110 so that other users who are linked to the user associated within the first mobile communication device 125 via social media, may download the application themselves. In turn, the further user of the mobile communication device (e.g., 130, 135) would also need to log-in via step 405 or step 410 (if they had already had an account set-up with the system).

At step 425, whenever a user associated with the mobile communication device 125 checks into the system 100 or interacts (for example by tapping a "like this app" button, or a retweet, etc) an update may be sent to their social media applications 140, 145, such as Facebook and/or Twitter and the like.

In addition to step 420, as the application is about to be downloaded, in the event that the user has provided their Twitter or Facebook details, they maybe required to perform a certain task in order to download the application, for example, in the context of Facebook they maybe required to click "like" in order to get the downloadable content or to get an enhanced version of the downloadable content. It is envisaged that in the context of Facebook, a new page may be provided over a predetermined time period which will need to be clicked or liked in order to access content advantageously increasing page impressions for that particular web page. The Facebook page may also update when the user associated with the mobile communication device 125 enters a competition for example. Similarly, in the case of a Twitter account which has been provided at step 405, the download link may be re-tweeted or if the user has entered a competition while logged-in, the system and method of the present invention may automatically re-tweet that the user has entered a competition together with a link to the competition.

Figure 5:
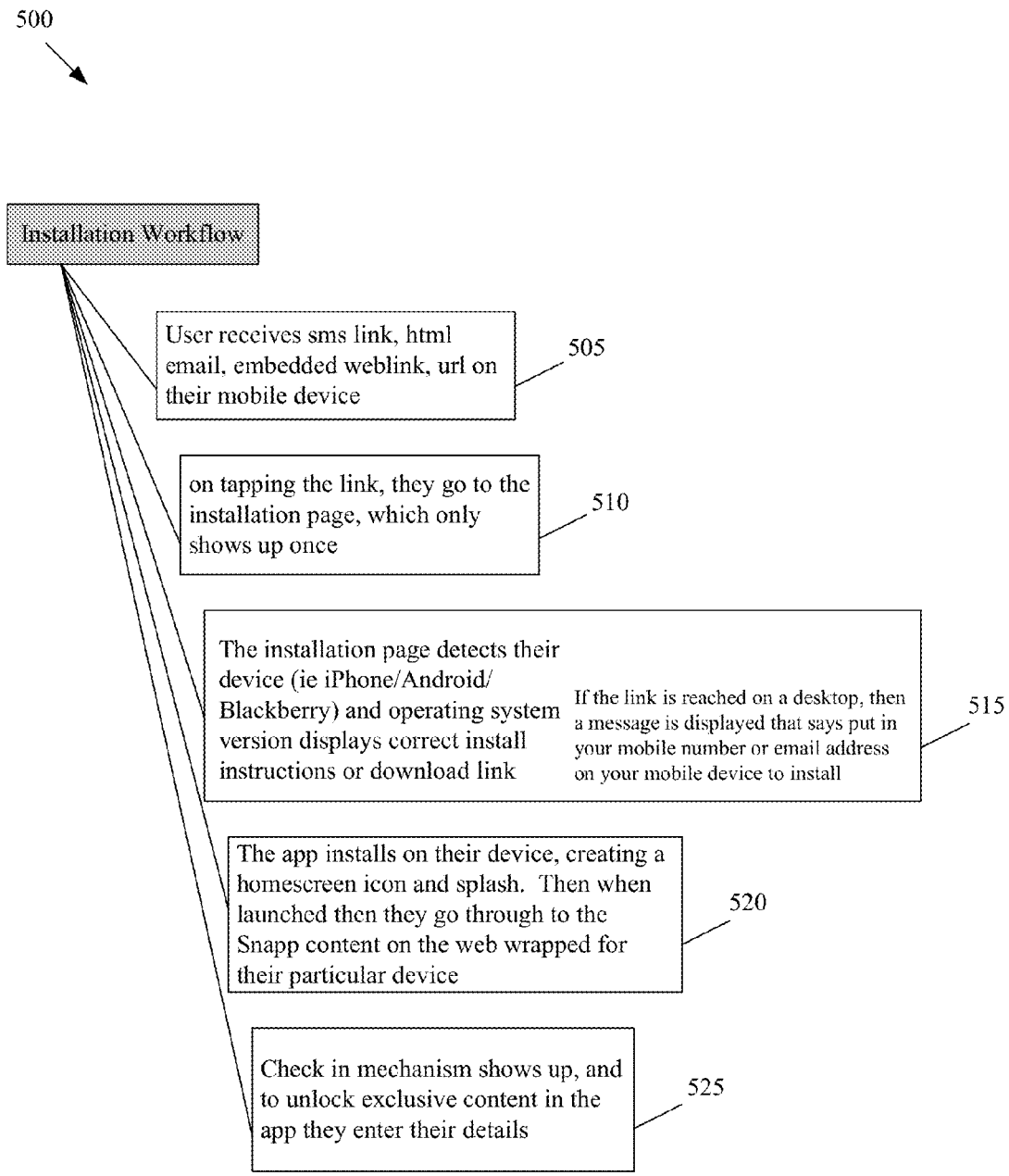
FIG. 5 is a flow chart of the user installing the application.

FIG. 5 is a flow diagram of a method 500, showing the installation of the downloaded application from a point of view of the user of the first mobile communication device 125.

At step 505 the user receives a SMS link, email or embedded web link, universal resource locator (URL) or the like on their mobile communication device 125. The user may have downloaded the application from the agent server 110 or it could be another user who has received the application via sharing from a user.

At step 510, upon tapping the link the user navigates to an installation page. At step 515, the installation page detects their device (i.e. what type of device such as an iPhone, Android phone or Blackberry phone etc) and the operating system being used together with its version and it provides appropriate installation instructions and/or a download link. This is achieved by browser detection code which is included in landing or download page.

In the event the link is reached via a desktop computer, for example, then a message may be displayed that prompts the user to provide their mobile number or email address associated with the mobile device to install. In this case, the system sends the app to their phone, then the user visits the install link, which detects their device as above.

At step 520, the application then installs on their mobile communication device which creates a home screen icon and a splash or installation load screen. Preferably the icon is an appropriate design relevant to the application downloads. Upon launching the application, the user of the first mobile communication device 125 will be provided with content which is appropriate to their particular device. Specifically, media, layout and content is optimised for the mobile communication device screen size and content is focussed on being appropriately concise for consumption on mobile devices, and video scales depending on available bandwidth available.

At step 525, the user of the first mobile communication device 125 is provided with a check-in mechanism which invites them to log into the agent server 110 in order to unlock exclusive content by entering in their details. The more details they enter the more content they can access in some cases.

Figure 6A:
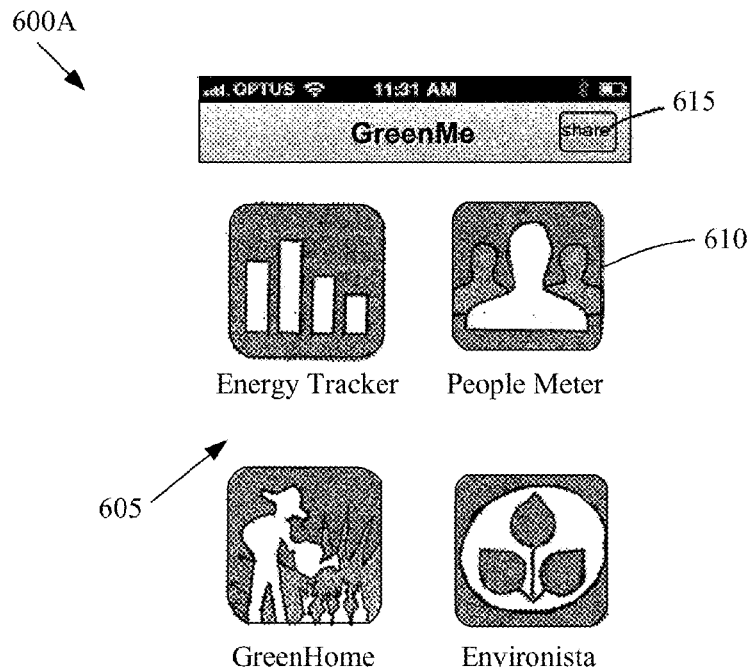
FIGS. 6A-6F are screen shots of an example of the application.
Figure 6B:
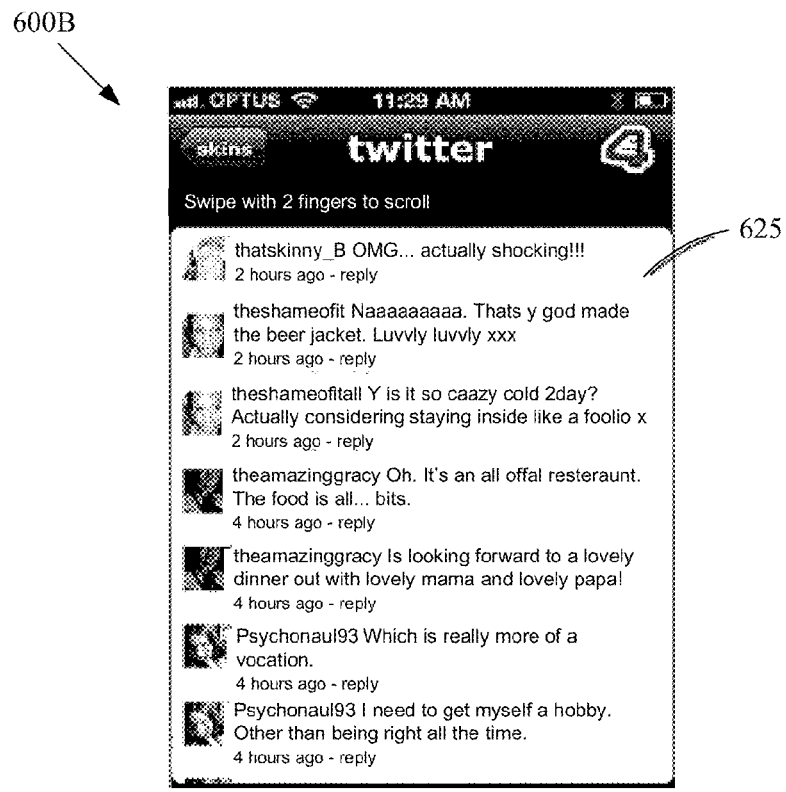
Figure 6C:
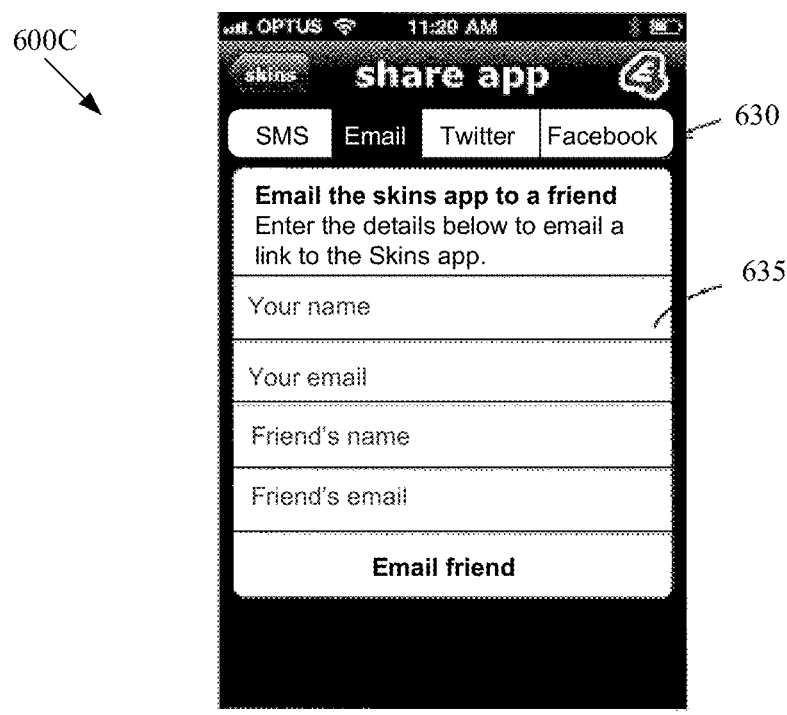
Figure 6D:
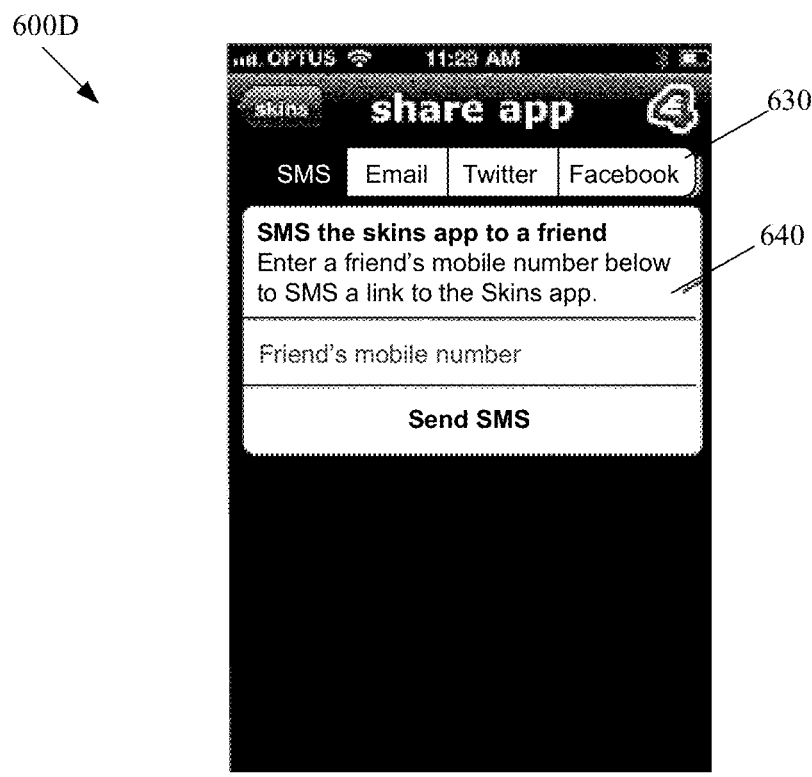
Figure 6E:
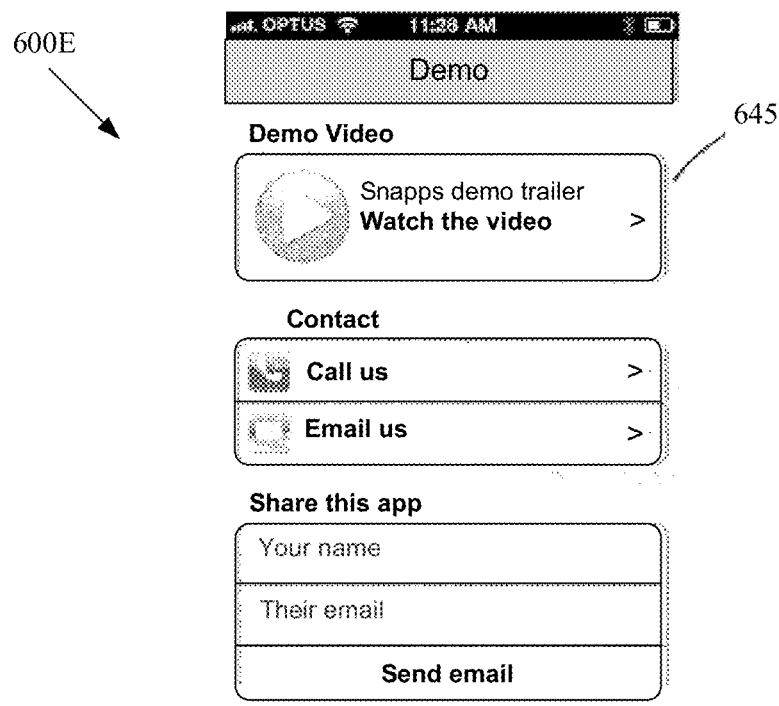
Figure 6F:

FIG. 6*a* 6*f* illustrate screenshots 600*a* to 600*f* showing sample applications which include a background 605 associated with one or more icons 610, a share button 615 is provided for sharing the application to another user. By clicking on the icon 610, the user can obtain more information about that icon or possibly exclusive content or video and the like associate with that icon, the amount of content visible being dependent upon whether or not the user has provided their details via the check-in mechanism on the agent server 110.

The background 605 may change by selecting one of the icons 610 or over a predetermined period of time, for example, in the context of a television programme or in the lead-up to the launch of a television programme, other icons 610 may be unlocked and/or the background 605 may change. Unlocking an icon 610 may require a login to the agent server 110.

FIG. 6b shows a screen shot 600b which is a twitter feed associated with an application which may be accessed via the application. In this way, the user can view information or in this case a twitter feed which is relevant to the application. In this case, it is a twitter feed in relation to a television program (and related application).

FIG. 6c shows a screen shot 600c after tapping the share button 615. There are a number of share options 630 such as SMS, Email, Twitter, Facebook which allows the mechanism by which the application will be shared. In this case, the user of the mobile communication device 125 has selected email and is presented with an entry box 635 to enter details so that the application can be emailed to another user associated with another mobile communication device 130, 135.

FIG. 6d shows a screen shot 600d after tapping the share button 615. There are a number of share options 630 such as SMS, Email, Twitter, Facebook which allows the mechanism by which the application will be shared. In this case, the user of the mobile communication device 125 has selected SMS and is presented with an entry box 640 to enter details so that the application can be SMS'ed to another user associated with another mobile communication device 130, 135.

FIG. 6E shows a screen shot 600e which allows the user of the mobile communication device 125 to contact a representative associated with the agent server 110 or watch a video 645 of how to use the application.

In addition, as shown in the screenshot 600f of FIG. 6F, one or more advertisements or offers 620 may be provided and associated with an application. It will be appreciated that the application 300 may further include a sponsor or advertisement 620, this may be a link, for example to the sponsor's website or a particular website which is specifically involved in campaign associated with that application.

Implementation

Figure 7:
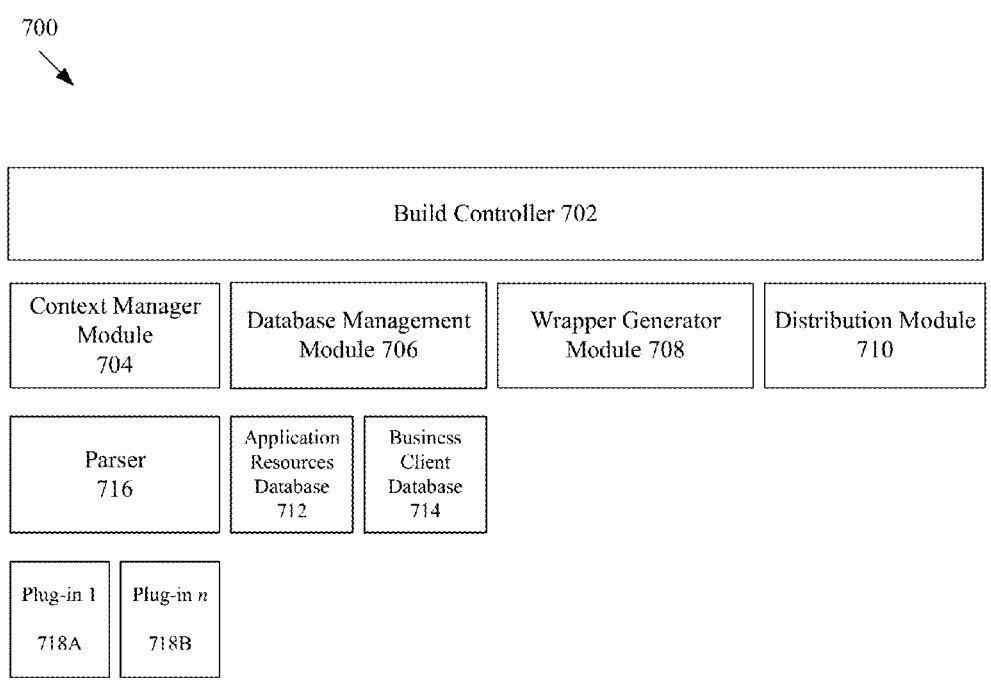
FIG. 7 is a block diagram of modules in the system.
Figure 8:
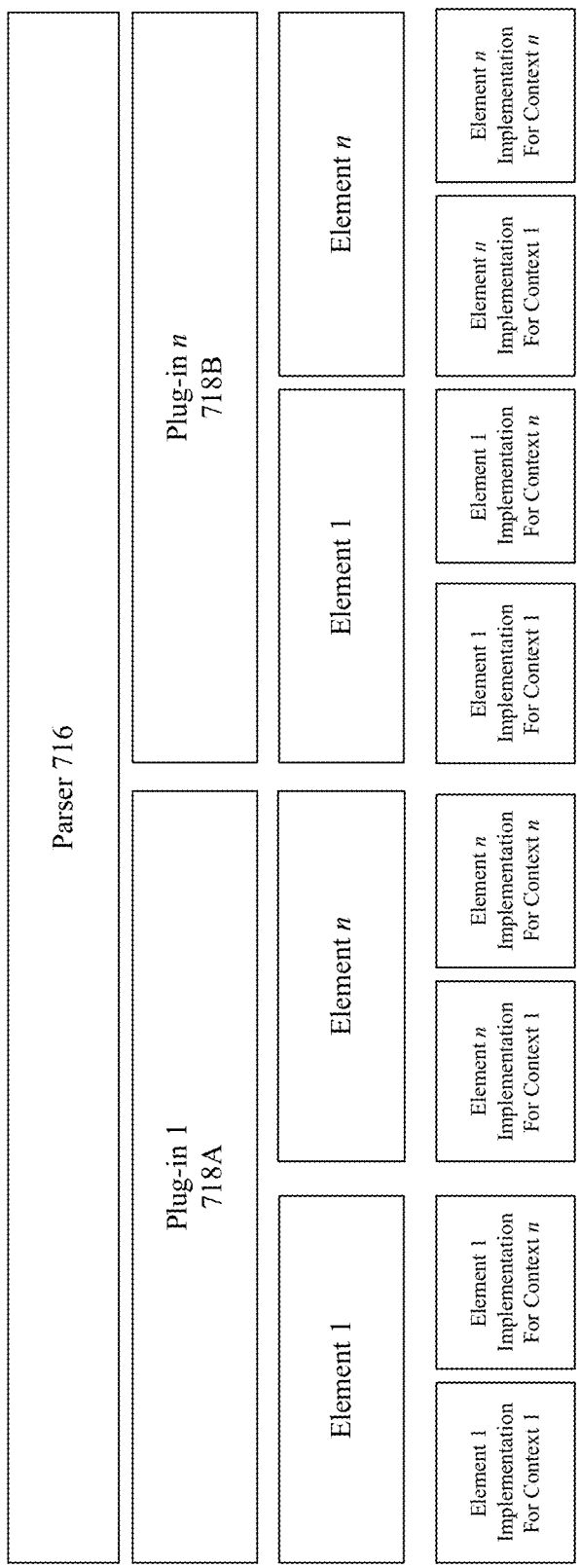
FIG. 8 is a block diagram of a parser and associated plug-ins of the system.

In an implementation of the system, an application generation system 700 comprises of a number of modules that are controlled by a build controller 702. The system 700 includes the following modules, as shown in FIG. 7: a context manager module 704, a database management module 706, a wrapper generation module 708 and a distribution module 710.

The build controller 702 is used for the application design, creation, wrapping and deployment.

The build controller 702 uses the context manager module 704 to invoke one or more parser 'contexts', indicative of the development or build phases that needs to be performed during a build sequence.

The full system 700 has a modular nature, which makes implementation and tight integration easier as the full build and design process is controlled in the same way. The plug-in/context architecture of the build controller 702 is built only once. The custom element implementations of the different contexts can be provided as needed: for example, the compression and performance optimization context can be implemented at a later stage than the other contexts with no detriment to the system 700. Like new custom elements, new contexts may be added to complement the build and design process and introduce further efficiencies.

A build sequence may be short—merely comprising of one single build step—or may be longer. For example, a build sequence may specify to just populate a template with content, or a longer build sequence may specify to populate a template with content, optimize it and wrap it into platform-specific binaries where appropriate.

The build controller 702 provides supporting functionality to the context manager module 704, including an interface to the database management module 706, an interface to the native wrapper generator module 708 and an interface to the distribution module 710.

In use, the build controller 702 receives a template (in the form or one or more template files) that includes custom elements and web-standard elements (e.g., HyperText Markup Language (HTML)-compatible elements). The output of each context invocation is a modified (e.g., augmented or refined) version of the original template, which can be subsequently fed to another context invocation, which can be the same context or a different context. In effect, the template provides a document (e.g., represented by one or more data files) that is modified by the system 700 based on the data or information is contains (and can thus be referred to as "self modifying") in one or more sequential generation phases. This template can therefore be considered to "evolve" through the generation phases/stages illustrated in FIGS. 9A-9F to an increasingly refined state. The template can thus act as content, a build script and storage memory, driving the build process in a more efficient and flexible manner than provided by other systems.

Database Management Module 706

The database management module 706 accesses data in an application resources database 712 and a business client database 714.

The application resource database 712 contains application resources data (such as images, text strings, generic settings) that are used to populate the template or used to derive platform-specific resources (such as application name, application bundle ID, icons, splash screens, hosting locations/services for different resource types).

The business client database 714 contains business client-specific data impacting individual application generation (such as permissions to use a specific feature, hosting locations/services for different resource types, etc.). In alternative simplified embodiments of the system, this database could be integrated with the application resources database 712, depending on whether there is a distinction between the business clients and the applications.

Context Manager Module 704

The context manager module 704 runs a parser module 716 that parses custom elements (i.e., elements not part of the standard HTML specification) in the processed template.

The build controller operates in a plurality of "contexts" that correspond to respective phases or stages of the development and provisioning process. The different contexts relate to the different aspects or stages of the application development design, build and distribution phases. In embodiments, some or all of the described contexts are used.

The outcome of parsing a custom element depends from the context of the system 700: a custom element in the template is parsed differently based on the context in which it is parsed.

The parser 716 is invoked at least once per context, but may be run more than once if controlled to do so by one of the plug-ins 718A, 718B associated with the parser 716. The plug-ins 718A, 718B can provide more granular parsing/resolution of the custom elements.

Figure 11:
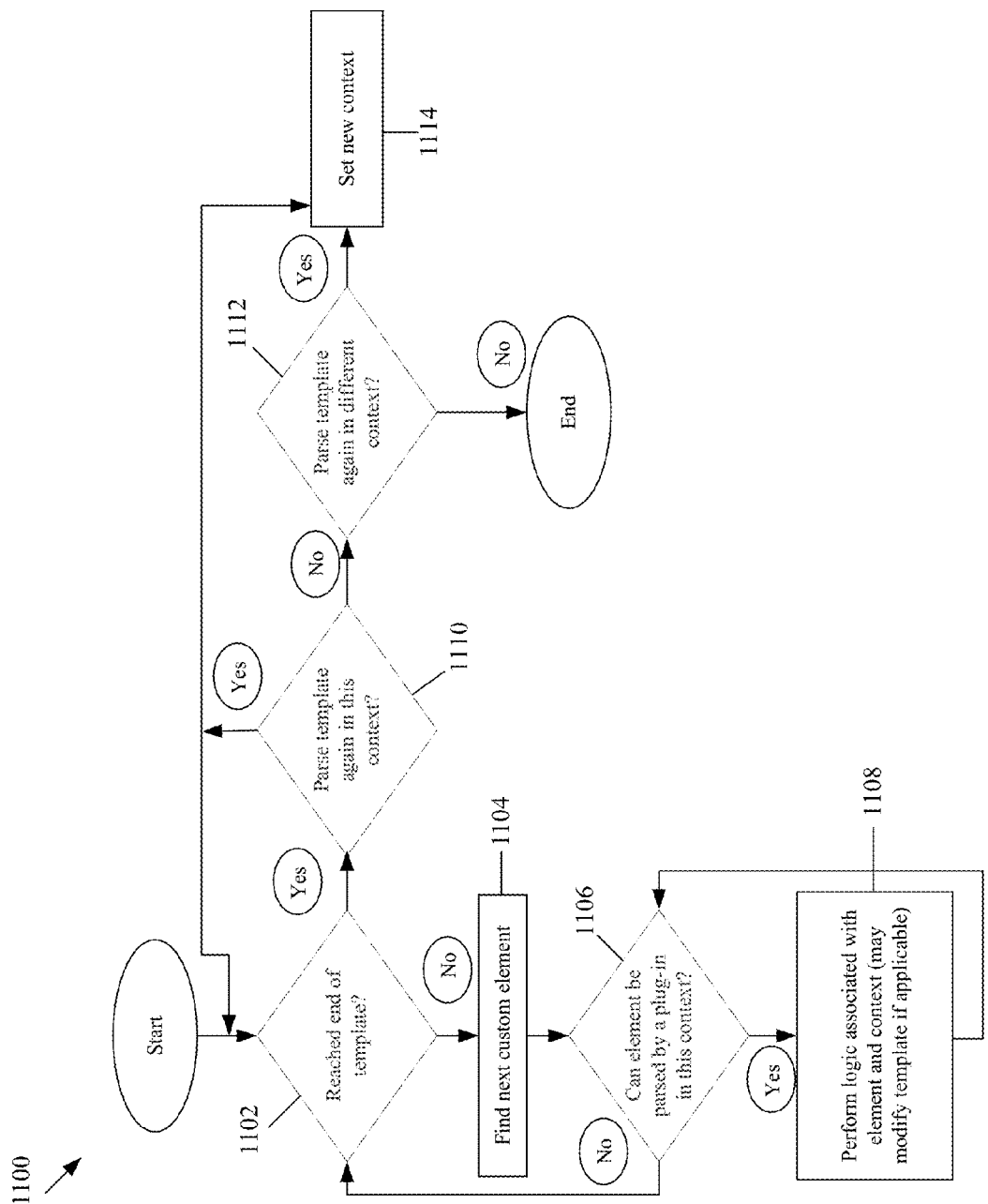
FIG. 11 is a flow chart of a parsing process performed by the system.

In a parsing process 1100, as shown in FIG. 11, until the end of the template is reached (determined in step 1102), the parser 716 detects the custom elements in the template (step 1104). Upon detection of a custom element, the parser 716 seeks for a plug-in that can handle the expansion of the custom element within the current context (step 1106): if such a plug-in (with an appropriate handler) exists within the current context, expansion of the custom element is handled by the plug-in (step 1108). Otherwise, if an appropriate plug-in does not exist in the current context, the custom element is ignored, and the parsing process 1100 return to step 1102. The parsing process 1100 ends when the end of the template is reached in step 1102, and none of the plug-ins have indicated that another parsing iteration is required, either in the present context (determined in step 1110), or a subsequent context (as determined in step 1112) in which case the next context is set (step 1114), and the parsing process 1100 returns to step 1102.

A single parser plug-in can handle a single custom element in a plurality of different contexts. For example, in one context, a custom element may trigger the creation of a field in a database, whereas in another context, that same custom element may substitute itself for content from a database from a certain field.

A single parser plug-in may handle multiple custom elements, and a single custom element may be handled by multiple plug-ins.

A parser plug-in may request the parser 716 to perform another iteration, upon completion of parsing the template, to resolve custom elements that the element handlers themselves inserted (referred to as inserted custom elements). Granular solving can improve robustness and maintainability of the parser 716.

The custom elements, which are otherwise ignored by most standard web content renderers (e.g., web browsers such as Firefox, Internet Explorer, Chrome or Safari) and what-you-see-is-what-you-get (WYSIWYG) web authoring tools, are used by the system 700 to specify how a template is processed within the different contexts it is parsed.

Common across all contexts, upon encountering a custom element, the parser 716, through invoking the logic in the correct plug-in (of the plug-ions 718A, 718B) for the custom element and context, may perform any one or more of the following:

(a) ignore the custom element;
(b) add a new custom element;
(c) remove the custom element;
(d) modify the custom element;
(e) add HTML-compliant web content based on the custom element; and
(f) perform internal house keeping in preparation for the next context or iteration of parsing.

Most standard web content renderers do not respond to the custom elements, thus the processed template can be displayed in these renderers for debugging, design and evaluation before, during and after each of the development phases/contexts.

Application Building Example

In an example of the application building/development process, as shown in FIGS. 9A-9F, a visual designer designs a raw template including: standard web content (also referred to as web-standard content), including HTML, cascading style sheets (CSS) and/or JavaScript) (shown as "A" in FIGS. 9A-9F); and non-standard custom elements (shown as "F" in FIGS. 9A-9F) representing content that is to be inserted at specific locations in the final processed template. These custom elements can signify the insertion of elements such as: text, images, custom styling abilities, or dynamic content (e.g., a Twitter feed).

Instructing the build controller 702 parse the template in a design context instructs any of the plug-ins 718A, 718B that handle the relevant custom elements (e.g., the text, images or Twitter feed) to populate the template with mock-up content (e.g., content that acts as a place holder to aid the designer with the visual design or layout of the template). The output from the parser 716 can then be viewed in a standard web browser to evaluate the design with the mock-up content. The mock-up content generated by the parser 716 aids the designer selecting an appropriate visual design (including design of a user interface of the app).

Once the designer indicates that the visual design of the template is complete, the build controller 702 parses the designed template in a "database creation" context. In this context, the plug-ins handle the creation of the application resources database 712 with fields for the different custom elements in the designed template that require populating. For example, if an element specifies that a text string is to be placed in a specific place, the plug-in that handles that type of custom element will, in this context, create a field in a database of type STRING. Similarly, if the custom element encountered by the parser 716 in this context specifies an image, the plug-in that handles that type of custom element will, in this context create a field in a database that is appropriate to hold an image (or a reference to an image). Similarly, if the custom element encountered by the parser 716 in this context specifies a custom element that specifies styling, the plug-in that handles that type of custom element will, in this context, create a field in a database that allows for selection of a style.

While parsing custom elements that define any mock-up content (shown as "F" in FIG. 9A) in the database creation context, the plug-ins modify the custom elements to remove sub-elements that relate to the mock-up/design content, and replace the mock-up content ("F") with "live" content, e.g., static content from a database ("C" in FIG. 9B), dynamic content or a feed ("B" in FIG. 9B), or natively augmented content ("D" in FIGS. 9B-9E). The processed version of the template can then be used to access data from a database when the custom elements are parsed in a "content population context". Thus, the template is modified based on its own contents, and it can be referred to as a "self-modifying" or "evolving" template.

After the database 712 has been created, along with all the fields that need to be populated to create a templated application end-product, the different incarnations of the applications are created/generated by making different entries for the different fields in the database. For example, one application's title in the database may be 'Pink Floyd' whereas the other application's title may be 'Michael Jackson'. Similarly an image that goes with the 'Pink Floyd' title would perhaps show an image of the band Pink Floyd, whereas the 'Michael Jackson' application title may be accompanied with a picture of Michael Jackson. The content can be provided to the database 712 by a designer (or a person selecting and providing appropriate content for the database fields (in the form of strings, images, URLs, user names for feeds, etc.) that need to be populated.

Once the database 712 has been populated with all application-unique content and settings pertaining to all the different applications to be generated, the system 700 generates the applications by pointing the build controller 702 to the appropriate record in the database 712, and instructing the build controller 702 parse the template from the database creation context in the content population context.

Any custom elements encountered by the parser 716 that can be expanded in the content population context (e.g., shown as "C" and "B" in FIG. 9B), are substituted by standard web content ("A") from the database that belongs to the selected database record.

Simultaneously, the parser 716, using the plug-ins 718A, 718B handling the custom elements, generates statistical metadata (e.g., resource types, resource sizes, resource usage patterns, counts, and projected loading times, etc.) about the resources (e.g., images, JavaScript and/or CSS) referenced in the template. The parser 716 also generates statistical metadata representing the distribution of similar content and keywords throughout the template. Based on the statistical metadata (also referred to as statistics), new custom elements are added to the template which indicate the statistics. Furthermore, areas of optimisation are inserted into the template as pointers for the next context (i.e., the "compression and performance optimization" context).

The build controller 702 can decide whether to expand the custom elements based on associated data in the business client database 714 that represent a business client's permissions. For example, a client may have paid for including a Twitter feed, but may not have paid for generating a Facebook feed. As the build controller 702 accesses the business client database 714 during parsing of the template (and specifically during the content population context), the business-selectable features can be included dynamically as the applications are being built.

By generating and storing custom elements in one context (the content population context) that act as pointers for the next context (the compression and performance optimisation context), the template is being used as a form of storage or memory: the template, as it is being processed, stores information or metadata that is used in a later context to refine itself towards finished web-standard compliant content.

Figure 9A:
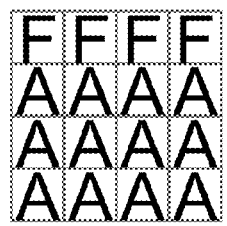
FIGS. 9A-9F are schematic diagrams of parsing of an example template for the application.
Figure 9B:
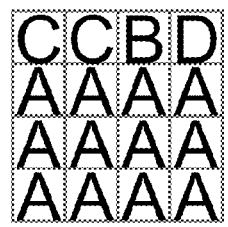
Figure 9C:
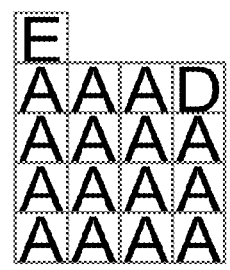
Figure 9D:
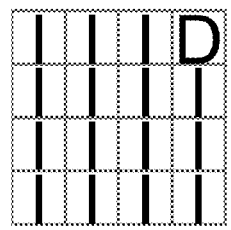

Following the content population context, the build controller 702 takes the newly generated template and uses it as an input in the compression and performance optimisation context. Again, the parser 716 detects any custom elements and passes them to the relevant plug-ins to handle. The optimization-specific custom elements that were inserted by the content population context are substituted for optimisations to the accompanying resources (for example image recompression) or to the template itself (e.g., moving HTML "DIV" elements to achieve a better compression ratio). In this stage, the standard web content ("A" in FIG. 9C) is transformed into bandwidth-saving web content ("I" in FIG. 9D represents standard web content optimised for compression).

After parsing the template in the compression and performance optimisation context, the template has been used to form corresponding web content which is optimised and only references optimised resources.

If no custom elements for native-specific or platform-specific functionality were present in the original template design, the output is now publishable web content.

If custom elements signifying native-specific or platform-specific functionality are present ("D" in FIGS. 9B-9E), and/or if it is necessary to wrap the content into a platform-specific binary, the build controller 702 takes the optimized template from the compression and performance optimisation context, and uses it as an input to a wrapper/distributable generation context. The native custom elements are used to augment the web content with platform-specific (also referred to as "native") functionality. The native custom elements require platform-dependent code ("H") to trigger their functionality on respective target platforms. The system 700 parses the template once more for these specific native custom elements to aggregate data representing all required functionality for each platform. The system 700 can then access the relevant platform-specific code from a library and include this in the wrapper.

The system 700 also includes a simple parser in the wrapper. The simple parser can detect the custom elements ("D") in a run-time environment and trigger the native code that is included by the custom elements, thus providing the natively sourced and augmented content (shown as "G" in FIG. 9F) at run time.

Wrapper Generator Module 708

The wrapper generator module 708 wraps the generated content as a native application (or app). The native app can be distributed through platform-specific channels, e.g., app stores, or by download as one or more binary files. Wrapping the content may be required to access certain platform-specific functionality that are referred to by custom native-functionality elements of the custom elements.

Figure 10:
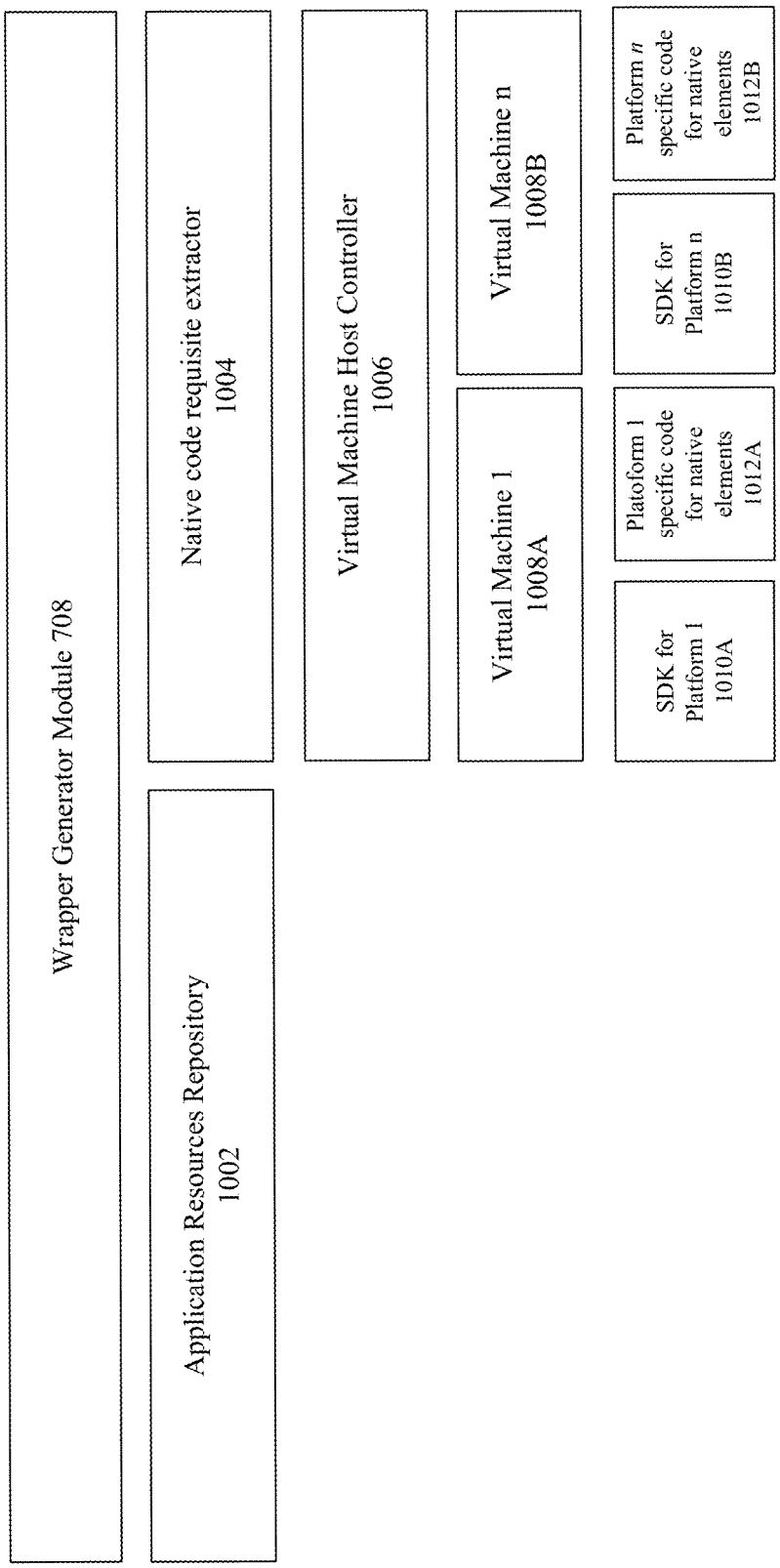
FIG. 10 is a block diagram of components in the system for generating a platform-specific distributable.

The content that is to be bundled with the application is delivered by the build controller 702 to an application resources repository 1002 accessed by the wrapper generator module 708 (as shown in FIG. 10). This content may be platform-agnostic content such as web content parsed and optimised by the build controller, or may come straight from the application resources database 712, for example an application and/or bundle name.

The wrapper generator module 708 analyses the template (part of the platform agnostic content) for custom elements specific to native functionality, and generates a list of the required code that needs to be included into the platform-dependent distributable app for that native functionality to work on that specific platform.

A virtual machine host controller 1006 runs a virtual machine 1008A, 1008B for each supported platform. The virtual machines 1008A, 1008B each have their own appropriate operating system and software development kit (SDK) 1010A, 1010B installed (for example MacOSX and Xcode/iOS, Ubuntu Linux for Android, Windows for BlackBerry, etc.).

Each virtual machine 1008A, 1008B is notified that a new build needs to take place by means of a simple notification mechanism (e.g., using a change in time stamp, or presence of a network-shared file as a trigger), upon which the virtual machines 1008A, 1008B start building a binary for each platform using the resources in the application resources repository 1002 and the list of code that needs to be added (if available). A build queuing mechanism is used for high volume applications.

Specific to each virtual machine 1008A, 1008B (and depending on the requirements of the SDKs 1010A, 1010B), the relevant platform-specific code 1012A, 1012B for each platform (which resides in a library on the virtual machine) is included in the binary.

The added code includes:
1. an in-app interpreter in the form of a platform-specific parser (which can be small/simple) that is configured to parse the custom native-specific functionality elements before passing them to the webview;
2. platform-specific code that implements the native-specific functionality when triggered; and
3. any supporting code required to create a functioning native application for that specific platform.

The in-app interpreter performs parsing of the native elements during execution of the applications on a computing platform associated with the platform-specific code, and in particular before loading the content into a web content viewer (e.g., a web browser) on the platform. This parsing step is performed typically only once per content request.

The in-app interpreter need not be included in all instances of the application, e.g., as described for platforms that forbid on-board parsers.

On each virtual machine 1008A, 1008B, the platform-dependent parser is added to the binary. During run time, the platform-specific parser converts any custom elements relating to native functionality in the template (as passed from the build controller 702 to be included with the distribution) into a "hooking" mechanism appropriate for the intended platform. Thus, the platform-specific parser can catch the invocation of native functionality from the web content. The included on-board native parser substitutes the custom native functionality elements for appropriate web standard compatible code in the content, just before the content is passed on to the web view to be rendered on the device.

For example, on one platform, a Foreign Function Interface (FFI) solution may exist to call native code from a web context, whereas another platform may lack such an interface but may instead allow for the native code to catch (universal resource locator) URL changes. In such a case, native code could be invoked by substituting custom native functionality elements with corresponding URL changes. In yet another platform-specific solution, a system log could be monitored from native code for changes originating from JavaScript based code embedded in the webcontent.

Having the platform-tailored custom native functionality element parser on-board with the native distributable allows for the final translation of the custom native functionality elements to be performed on the device, rather than during the wrapping. This allows for the platform-agnostic content/template (with custom native functionality elements still embedded) to reside on a remote server (e.g., the server 110), without requiring a final version (i.e., with custom native functionality element hooking code already interpreted for each specific platform) of the content. This allows remote updating of the content without having to re-wrap and re-distribute all applications each time that content changes are made (with the exception of the case where new custom native functionality elements are added, for which corresponding native code was not compiled into the distributed native applications).

The platform-specific code that implements the behaviour of the custom native functionality elements is added to the binary. The mechanism for this is also platform dependent, depending on the capabilities of the targeted platform's operating system and the compiler and SDK. In one embodiment, a dynamically generated source file can be used, including all the code. In another embodiment, a shared object or dynamically linkable library can be used, including all the code. In the case of a shared object or dynamically linkable library, the shared object or dynamically linkable library is meant for the generated application and is not shared with other applications on the user device; the application merely leverages the target operating system's ability to dynamically check for and load functionality.

Lastly, generic native code is added, according to specifications by the platform's vendor, as required to create a functioning application for the targeted platform, within which the content can be viewed and any native functionality can be invoked.

Any platform-specific resources, such as application icons or splash screens, may be automatically derived from a master resource located in the application resources repository 1002. For example, an platform-specific icon may be generated from a master file by scaling down the graphic to the platform vendor's specification.

Upon compilation of the native code and the inclusion of any platform-specific resources, the final binary is signed per vendor specification and passed to the distribution module 710.

Figure 9E:
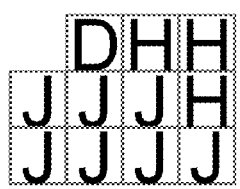
Figure 9F:
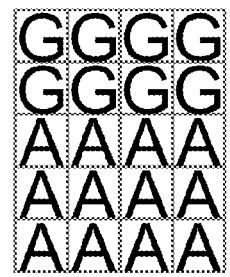

An example final binary, as shown in FIG. 9E, includes elements for natively augmented content ("D"), platform-specific code to access native element functionality ("H"), and compressed static web standard content ("J").

A special case with regards to including an on-board parser is the case where artificial restrictions are imposed on inclusion of such a parser into the code by a vendor and/or parsing of downloaded content (as, for example, specified in the iOS Developer Program License Agreement). In this case, any custom elements that would otherwise be parsed on-platform at run-time to invoke native functionality are instead parsed at a different stage as applicable to circumvent said restrictions. It is not the native functionality itself that needs to be parsed, rather the hook mechanism that invokes the native functionality (native code for which resides on the device because it is part of the distributable). To circumvent restrictions regarding interpretable code included in a binary, the custom native functionality elements are pre-parsed at compile time into platform-specific (but web-standard compliant) hook code to be included with the distributable. To circumvent restrictions regarding interpretable code that is downloaded from an on-line source, the custom native functionality elements are pre-parsed by the web server by an on-line interpreter in the form of an on-line parser into platform-specific (but web-standard compliant) hook code upon detecting that the request for the content originates from the restricted platform. In both cases, interpretation of the custom native functionality elements are performed outside the target platform and as such, permissible under the artificial restrictions. In both cases, the content placed on the device will thus take the form of standard web content without any custom elements that need interpreting, while web-standard compliant hook code still allows for the invocation of native functionality.

The hook code intercepts messages (including function calls, events, etc.) passed between software components in the platform, and can be implemented in different ways, as described above. The hook code intercepts the messages indicating that the web standard will perform a selected function (e.g., visit a new URL, write to a log, access a particular resource, etc.), and controls the platform to instead do something else (e.g., perform the native functionality).

Distribution Module 710

The distribution module 710 distributes the binary according to vendor specifications (for example App Store submission), or stores the binary in a pre-defined location on a server in the local network or on the Internet, ready for distribution through other means (as described hereinafter). The distribution module 710 can configure a web server or sub-domain on a web-server if required, using information from the application resources database 712 and/or the business client database 714. The distribution module 710 can submit different resources to different hosting systems (for example third-party video and audio playing systems or web hosting systems) using information from the application resources database 712 and/or the business client database 714. The distribution module 710 can upload proper logic to a network location to provide data at the corresponding unique network address/link for sharing the application(s).

Design and Database Creation

In the design context, the template's content is parsed by the parser 716 for visual design purposes. For example, a custom element, whose purpose it is to fetch an image from a central repository and render the picture in a HTML DIV, will perform said function in a mock-up capacity. In other words, whereas the same custom element would, in the content population context, cause the parser 716 to fetch dynamic content from a database, in this instance during the design context, when viewed in a browser or WYSIWYG editor, the parser 716 it instead show a place holder to act as guidance for the visual designer.

Example custom elements can include:

<ADAPPSTRINGFROMDB id="bandname" mockupstring="The Jezabels"/>;

<ADAPPIMAGEFROMDB id="bandlogo" mockupimage="mockuplogo.jpg" width=320 height=200/>; and <ADAPPTWITTERFEED id="bandtwitterfeed" mockupusername="theJezabels"/>

The custom element ADAPPMOCKUPTEXT can be used to show a temporary place holder string ("The Jezabels") as a placeholder for a band name, and then later (in the database creation context) be used to provide to a real field of type STRING in a database. For example, ADAPPMOCKUPIMAGE will be used to show a place holder image (mockuplogo.jpg) of 320 by 200 pixels in size, and will later be used to (in the database creation context) provide a real field of type BINARY in a database where an image can be stored.

In another example, ADAPPMOCKUPTWITTERFEED will be used to show a mock-up Twitter feed closely resembling that of the output of the ADAPPTWITTERFEED custom element (by inserting a real Twitter feed from user 'theJezabels' as a temporary placeholder feed). This example custom element will later be used to generate a Twitter user entry field in the database creation context, and then later replaced in the content population context with a real Twitter feed that corresponds to a real Twitter user name from the database.

All parameters pertaining to mocking-up content are removed in the database creation context.

As most content viewers ignore custom elements that are not recognised, the custom elements in the otherwise HTML-compatible template (as generated by the system 700 in the design context) allow for template designers to use most industry-standard WYSIWYG editors, as well as all popular modern browsers to view their design. This can reduce or eliminate the need for a designer to write any computer code.

The subsequent detection and creation of a database that matches the design provides efficiency in the work flow in contrast to systems and methods in which a database is generated prior to the designing step, as a separate task by a database engineer (rather than a visual web designer).

Compression and Performance Optimisation Context

An optimisation plan for the template, including statistics about the content that were gathered by parsing of the template within previous contexts, may further be used to improve and enhance the performance characteristics when rendering the content. The optimisation plan can be represented by optimisation elements ("E" in FIG. 9C) in the template that include optimisation and compression metadata.

Data compression can be made more efficient if more is known about the characteristics of the data. Because much of the web content in the template is generated dynamically, the system 700 can access data representing the characteristics and statistics of the web content. For example, if a common HTML element such as <IMG> is used many times in the final web-friendly content (generated by the content population context), the system 700 can record how many times as the elements are generated (when expanding a non-standard HTML element that resulted in these <IMG> entries).

The web content can be compressed using a dictionary-based compression process (such as LZ78) where the dictionary has been pre-populated with data representing the occurrence of the recurring elements. The compression process, primed with the dictionary, does not have to discover and build the dictionary from scratch, and can thus be more efficient. The dictionary-based process can then compress the content, attach it as a payload to a HTML document as JavaScript, and include a JavaScript decompressor (with custom pre-populated dictionary) to decompress the payload into the original content. Examples of various decompression processes with payloads attached (but without content-based dictionary priming) in Javascript are commercially available.

Alternatively, a compression process, e.g., based on the Lempel-Ziv-Welch (LZW) algorithm, can be fine tuned with efficient clear code signalling by generating the content in a compression friendly pattern, for example by grouping <IMG> entries and signalling an LZW clear code after all <IMG> entries have been encoded.

The compression efficacy of the content, even when using standard GNU zip (GZIP) compression (e.g., as found in most Apache web server installations), can be enhanced by adapting the sequence by which web content appears in the resulting output. Physically grouping content so that similar keywords are encountered close together in the content (without necessarily impacting function or visual representation) can benefit most compression algorithms and reduce transmission bandwidth requirements from transmission of the compressed app over the network 105.

Performance optimisations, reducing wait times and/or reducing loading times can be provided by wrapping portions of the generated web content in asynchronous loading or processing code, or changing the loading sequence of content. The system 700 can record which content would be suitable for these performance optimisations during the expansion of custom elements.

The compression and performance optimisation context can include intelligent re-compression of resources, e.g., from a high-resolution portable network graphic (PNG) format to a lossy but more compact Joint Photographic Experts Group (JPEG) format. The suitability of intelligent compression is determined by recording custom and non-custom element use that indicates how a resource is used in the final web content. For example, if a PNG used for its alpha channel capabilities then it is kept, however if no alpha channel is needed, then lossy JPEG compression is a better candidate as there is no need to use the larger lossless PNG format.

In the compression and performance optimisation context, lossy re-compression of suitable resources (for example audio or images) may be performed according to a total pre-determined size budget set for the application. Resources belonging to different custom and non-custom elements may be given different weights, leading to resources, which are determined to be less important (based on their element type and use), to be compressed more than other resources, which are determined to be more important. Thus an application's bandwidth versus quality trade-off can be controlled precisely.

Compacting of scripts, HTML and CSS code, not specific to the system, may be performed during parsing within the compression and performance optimisation context, for example using code strippers and compactors such as Minify.

Wrapper Generation Context

When targeting specific platforms and operating systems, wrapping the content in logic that performs additional functionality may be desirable. This makes the applications deployable through platform specific means (for example app stores) or other distribution methods (for example 'side loading').

The custom elements whose task it is to augment the web content with platform-specific (native) functionality, will require platform-dependent code to trigger said functionality on the target platform.

Parsing the template once more for these specific custom elements lets the system 700 aggregate all required functionality for each platform for which a wrapper needs to be generated. the system 700 can then pull the relevant platform-specific code from a library and include this in the wrapper.

Only code which is needed to support the content needs to be included for that particular platform: it is not necessary to include a generic parser that may include supporting code that is not used by the content. This static linking solution can keep the final size of the natively augmented content much smaller than if a generic parser were to be included with all code. A further benefit of this static linking approach is that a fully self-contained application is generated, and no dynamically linkable libraries or frameworks need to be installed to run the application.

For applications or platforms that do not require or do not have an Internet connection, web content that would normally reside on the web server can be packed with the wrapper, so that the application can run without an Internet connection. Such an application would use on platform-specific updating mechanisms for application updates.

A hybrid model is also possible where initial content is delivered along with the application so that the application can work without an Internet connection; however, when an Internet connection is available, the application can check for new content and update any content that is out-of-date.

Run-Time Custom Element Parsing

The final context within which custom elements are evaluated is when the content is prepared for and interaction with the user. The parsing takes place before the final content is loaded into the webview or browser.

By catching custom elements that are embedded in the webcontent, the webcontent can be enhanced and augmented with functionality and content that is only possible to obtain when there is access to the full resources of the device on which the application is running (e.g., beyond the scope of a stock web browser). Examples include, but are not limited to, access to the calendar, address book, phone functionality (including SMS), camera, native code execution (number crunching, image recognition, native games, digital signal processing), external storage, music library, etc.

Similarly, the webapp can use other types of add-on in-browser functionality where available, e.g., content for optional browser plug-ins, such as Flash or Java, or for JavaScript-based SDKs such as the Facebook SDK.

However, the webcontent need not require such native access, thus it is possible to have a gracefully degrading webapp version alongside a natively augmented version of the application. The webapp version can, for example, serve as a demo or preview, while the natively augmented version can serve as a premium offering, or vice versa.

Figure 12:
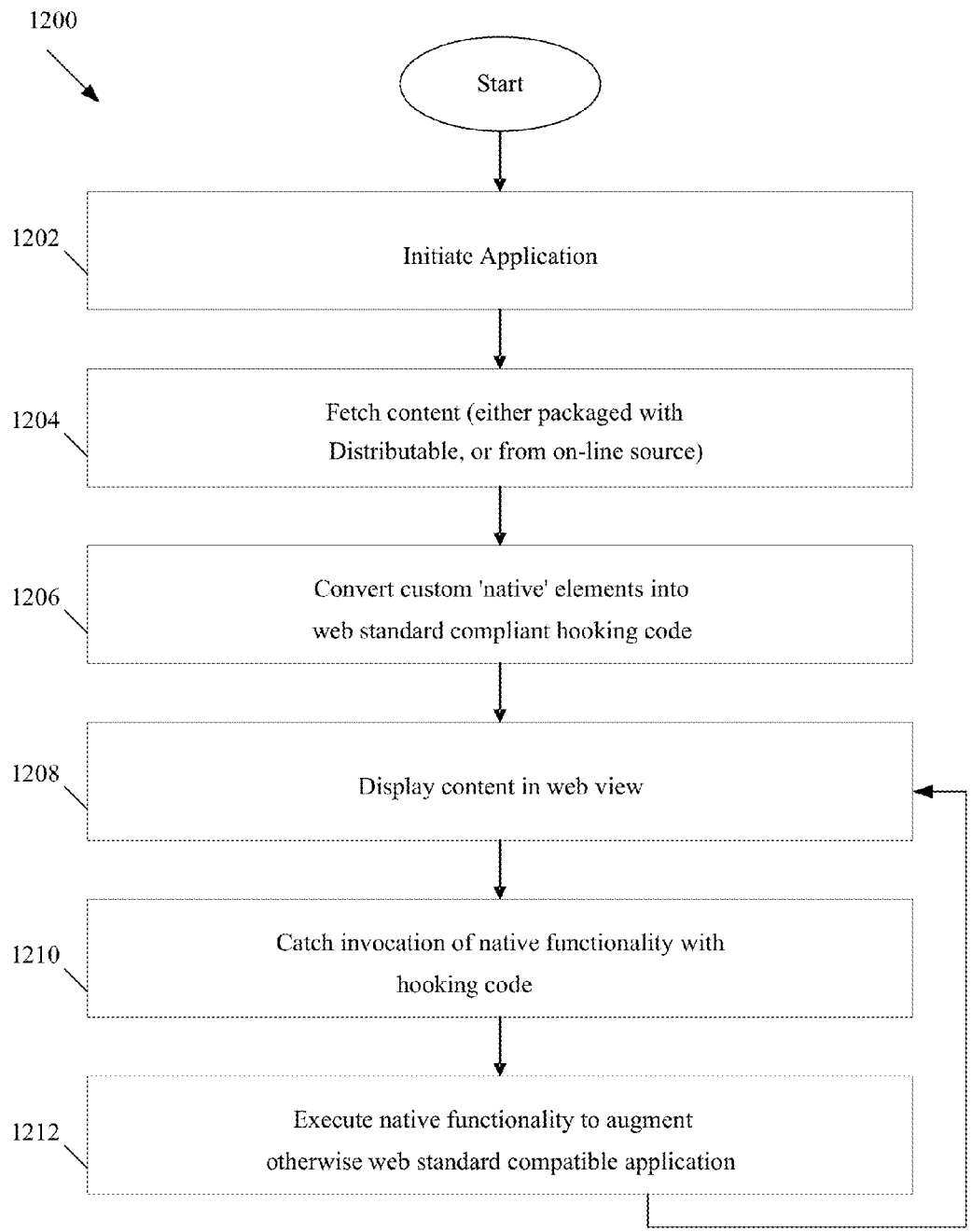
FIG. 12 is a flow chart of an application execution process, including run-time events that follow once a native version of the application is launched, performed by the system.

In an application execution process 1200, as shown in FIG. 12, the application is initiated (step 1202), e.g., by a user accessing the unique URL or starting the application via the operating system on the device. The application then accesses its content for display and operation (step 1204), including accessing local content that is packaged with the application (using computer storage or memory on the device) and/or remote content (using a network connection), e.g., using the Internet (step 1204). The application then controls the platform to convert native elements in the application into web-standard-compliant hooking code (step 1206). The application displays the content on the device, e.g., in a web view (step 1208) and monitors the device to catch any invocation of native functionality (e.g., based on a signal from a device-specific apparatus, such as an accelerometer, gyroscope or global positioning system) using the hooking code (step 1210). The native functionality is used to augment the otherwise standard web-based application in accordance with the particular native functionality detected (step 1212), then the application continues to display the content (in step 1208) until it is terminated.

Backwards Compatibility and Future Proofing

The gracefully degrading web content allows any platform that can display simple web content, past or future, to render the contents of the application, whether it be as a web app, or as a native application. For example, if Apple were to shut down the ability to install web apps outside the App Store, the system 700 can generate of App Store-ready apps with little effort.

The custom native functionality elements are only parsed just-in-time (e.g., just before the content is presented in a web view or web browser), thus platforms, whether they be on-device or online, that permit insertion of an entry in, for example a calendar, would perform the same function, no matter what service is used. If a new on-line service becomes popular for calendar management and it has a publicly available API, only a single plug-in in the on-line parser needs to be added to make the on-line parser expand the relevant custom native functionality elements to the relevant code for the new service.

Common, Readable Language

The use of a human-readable template throughout the building process establishes a common language for an otherwise complex build system. Being able to inspect the evolution of the template as it is parsed in the different context allows for efficient troubleshooting and/or midbuilding intervention in between context switching (for example by removing or adding custom elements manually or comparing before- and after output from a particular context).

The template acts as content, buildscript and memory, and thus provides an informative snapshot of the build controller's state at any given time.

Shareability

The platform-agnostic nature of the content and applications generated by the system 700 allows for platform-agnostic accessing of said content. Further building on this notion, the system 700 provides a method of sharing the application across these different platforms. By providing an option to share a link to the application, through various platform-dependent (SMS, platform dependent messaging services, etc.) and platform-agnostic (Twitter, Facebook, e-Mail, etc.) means, users can in effect share the application with anyone, no matter the device the receiving party uses.

Figure 13:
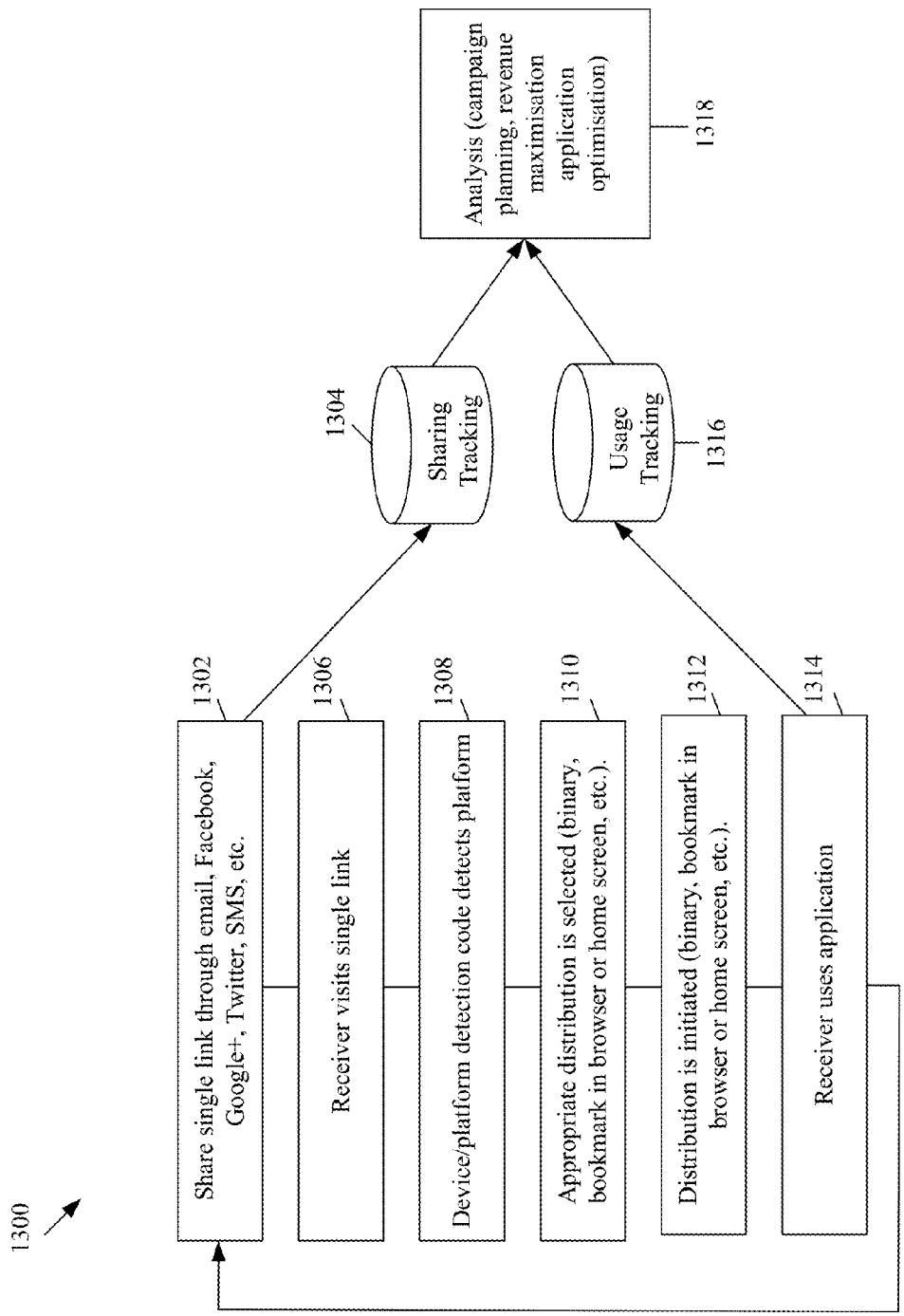
FIG. 13 is a flow chart of a sharing and usage tracking process performed by the system.

In a sharing process 1300, as shown in FIG. 13, an application-unique link is shared, using the application, through email, a networking website (e.g., Facebook, Google+, Twitter, etc.), SMS, etc, (step 1302), and the application reports the sharing step by sending data to a remove share tracking server (step 1304). The receiving user then accesses the shared link (step 1306). The shared link takes the receiving user to a web page that performs device and environment detection (step 1308), and the most appropriate version for that device or environment is selected (step 1310), and distribution is initiated (step 1312). The most appropriate version for that device may be in the form of an automatically starting binary download, it may be in the form of a chromeless web app that is bookmarked on the device's home screen, it may be in the form of a link to an item page in an application store, it may be a new tab in a web browser, etc. Multiple shareable unique application links may be shared for a single application: e.g., one for a cut-down (free) web version of the application, and the other for a premium (paid) version in a store with natively augmented functionality for mobile devices.

Analytics and Trackability

As much of the content is web based, an analytics system such as Google Analytics can be used to track user viewing behaviour within the app.

In the sharing process 1300, when the receiving user uses the new application (step 1314), data representing their usage is generated and transmitted to a remote tracking server (step 1316). The sharing data and the tracking data can then be used in analysis processes, e.g., for campaign planning, revenue maximisation, application modifications, etc. (step 1318).

Commercially available analytics can be combined with statistics about how individual users share the app, to generate data representing the reach of the app, networks of the users of the app, the effectiveness of the content, and the virality (e.g., based on how many times the application is shared per user) of the app. For example, an analytics-equipped application can be used to generate data representing aspects of an advertising campaign such as reach, content response and interest levels over time; this data can then be used select an appropriate time to rekindle interest by renewing the content.

Interpretation

Many modifications will be apparent to those skilled in the art without departing from the scope of the present invention as hereinbefore described with reference to the accompanying drawings.

Reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which the specification relates.

RELATED APPLICATIONS

The originally filed specification of the following related application is incorporated by reference herein in its entirety: Australian Provisional Patent Application No. 2011900257, "Method and System for Providing Content", filed on 27 Jan. 2011.

The invention claimed is:

1. A computer-implemented method for generating one or more applications with an agent server device, wherein the agent server device executes instructions that perform the method, including the steps of:
    accessing a template for holding content;
    in a design phase, receiving data representing design selections for the applications made by a designer, and modifying the template based on the design selections, wherein the template includes one or more web-standard elements and one or more non-web-standard custom elements, and wherein the non-web-standard custom elements of the template are parsed to populate the template with mock-up content items that act as placeholders for the items of content;
    in a database creation phase following the design phase, parsing the non-web-standard custom elements to generate a resources database including database fields for respective items of the content;
    receiving the items of content based on selections by a designer, and storing the items of content in the resources database;
    in a content population phase following the database creation phase, parsing the non-web-standard custom elements to generate the plurality of applications, configured for a plurality of computing platforms, by populating the template with the content by accessing the content in the resources database; and
    in a distribution phase following the content population phase, storing the plurality of applications for distribution by a server.

2. The method of claim 1, including the step of parsing the non-web-standard custom elements to generate web-standard elements for the applications.

3. The method of claim 1, including the steps of including one or more non-web-standard native elements in the template; and parsing the non-web-standard native elements to generate platform-specific code in the applications.

4. The method of claim 1, including the steps of:
    parsing one or more of the non-web-standard custom elements to generate one or more further non-web-standard custom elements; and
    parsing the further non-web-standard custom elements to generate one or more of the web-standard elements or web-standard content.

5. The method of claim 1, including the steps of:
    in the content population phase, parsing the non-web-standard custom elements and the web-standard elements to generate an optimisation plan for bandwidth optimisation of the applications based on the template; and
    in a compression and optimization phase following the content population phase, compressing the generated applications based on the optimisation plan.

6. The method of claim 5, wherein the optimisation plan includes statistics about the content in the template.

7. The method of claim 5, wherein the optimisation plan is represented by metadata about the template.

8. The method of claim 1, including the step of generating binary executable versions of the applications.

9. The method of claim 1, including the step of receiving the content from a client server.

10. The method of claim 1, including the step of selecting the plurality of computing platforms.

11. The method of claim 1, wherein the applications are configured for use on mobile communication devices and/or web-enabled computing platforms.

12. The method of claim 1, including transmitting the applications using a mobile communications network.

13. The method of claim 1, wherein the template is at least partially human-readable.

14. Non-transitory computer-readable storage with instructions configured to perform the method of claim 1.

15. The method of claim 1, further comprising a step of providing a link for sharing the applications between different mobile communications devices.

16. A system for generating a plurality of applications, the system including:
 a memory for storing instructions; and
 a processor for executing instructions for employing modules, including:
  a context manager module configured to determine a design phase, a database creation phase following the design phase, a content population phase following the database creation phase, and a distribution phase following the content population phase;
  a build controller module configured to:
   access a template for holding content, and
   in the design phase, receive data representing design selections for the applications made by a designer, and modify the template based on the design selections, wherein the template includes one or more web-standard elements and one or more non-web-standard custom elements;
  a parser module configured to:
   in the database creation phase, parse the non-web-standard custom elements to generate a resources database including database fields for respective items of the content, and
   in the content population phase, parse the non-web-standard custom elements to generate the plurality of applications, configured for a plurality of computing platforms, by populating the template with content by accessing the content in the resources database; and
   in the design phase, parse the non-web-standard custom elements of the template to populate the template with mock-up content items that act as place-holders for the items of content; and
  an application resource database module configured to receive the items of content based on selections by a designer, and store the items of content in the resources database; and
  a distribution module configured to, in the distribution phase, store the plurality of applications for distribution by a server.

17. The system of claim 16, wherein the parser module is configured to, in the content population phase, parse the non-web-standard custom elements to generate web-standard elements for the applications.

18. The system of claim 16, wherein the parser module is configured to parse one or more non-web-standard native elements included in the template to generate platform-specific code in the applications.

* * * * *